(12) United States Patent
Malshe et al.

(10) Patent No.: US 9,499,766 B2
(45) Date of Patent: *Nov. 22, 2016

(54) NANOPARTICLE COMPOSITIONS AND METHODS FOR MAKING AND USING THE SAME

(71) Applicant: Board of Trustees of the University of Arkansas, Little Rock, AR (US)

(72) Inventors: Ajay P. Malshe, Springdale, AR (US); Arpana Verma, Fayetteville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/921,640

(22) Filed: Jun. 19, 2013

(65) Prior Publication Data

US 2014/0024565 A1    Jan. 23, 2014

Related U.S. Application Data

(63) Continuation of application No. 12/160,758, filed as application No. PCT/US2007/060506 on Jan. 12, 2007, now Pat. No. 8,492,319.

(Continued)

(51) Int. Cl.
*C10M 169/04* (2006.01)
*C10M 169/00* (2006.01)
(Continued)

(52) U.S. Cl.
CPC ......... *C10M 169/04* (2013.01); *C10M 125/22* (2013.01); *C10M 169/042* (2013.01);
(Continued)

(58) Field of Classification Search
CPC .............. C10M 125/22; C10M 171/06; C10M 2201/04; C10M 2201/041; C10M
(Continued)

(56) References Cited

U.S. PATENT DOCUMENTS 3,172,892 A    3/1965  Le Suer
3,666,662 A    5/1972  Lowe
(Continued)

FOREIGN PATENT DOCUMENTS

CN    1080648    1/1994
JP    63-040708    2/1988
(Continued)

OTHER PUBLICATIONS

Bakunin, V.N. et al., "Synthesis and application of inorganic nanoparticles as lubricant components—a review", J. Nanoparticle Res. (2004) 6:273-284.
(Continued)

*Primary Examiner* — Latosha Hines
(74) *Attorney, Agent, or Firm* — Akerman LLP; Stephen C. Glazier

(57) ABSTRACT

A composition that includes solid lubricant nanoparticles and an organic medium is disclosed. Also disclosed are nanoparticles that include layered materials. A method of producing a nanoparticle by milling layered materials is provided. Also disclosed is a method of making a lubricant, the method including milling layered materials to form nanoparticles and incorporating the nanoparticles into a base to form a lubricant.

217 Claims, 12 Drawing Sheets

Related U.S. Application Data

(60) Provisional application No. 60/758,307, filed on Jan. 12, 2006.

(51) Int. Cl.
| | |
|---|---|
| *C10M 169/06* | (2006.01) |
| *C10M 171/00* | (2006.01) |
| *C10M 125/06* | (2006.01) |
| *C10M 111/04* | (2006.01) |
| *C10M 171/06* | (2006.01) |
| *C10M 125/22* | (2006.01) |

(52) U.S. Cl.
CPC ........ *C10M 171/06* (2013.01); *C10M 2201/04* (2013.01); *C10M 2201/041* (2013.01); *C10M 2201/042* (2013.01); *C10M 2201/06* (2013.01); *C10M 2201/061* (2013.01); *C10M 2201/062* (2013.01); *C10M 2201/065* (2013.01); *C10M 2201/066* (2013.01); *C10M 2201/081* (2013.01); *C10M 2201/082* (2013.01); *C10M 2201/084* (2013.01); *C10M 2201/087* (2013.01); *C10M 2201/103* (2013.01); *C10M 2203/0206* (2013.01); *C10M 2203/1006* (2013.01); *C10M 2205/163* (2013.01); *C10M 2207/0406* (2013.01); *C10M 2207/1285* (2013.01); *C10M 2207/2815* (2013.01); *C10M 2207/2835* (2013.01); *C10M 2207/401* (2013.01); *C10M 2213/046* (2013.01); *C10M 2213/062* (2013.01); *C10M 2215/0813* (2013.01); *C10M 2223/103* (2013.01); *C10M 2229/025* (2013.01); *C10N 2210/02* (2013.01); *C10N 2210/03* (2013.01); *C10N 2210/04* (2013.01); *C10N 2210/08* (2013.01); *C10N 2220/082* (2013.01); *C10N 2230/56* (2013.01); *C10N 2250/10* (2013.01); *Y10T 428/2982* (2015.01)

(58) Field of Classification Search
CPC ..................... 2201/042;C10M 2201/06; C10M 2201/061; C10M 2201/062; C10M 2201/065; C10M 2201/066; C10M 2201/081; C10M 2201/082; C10M 2201/084; C10M 2201/087; C10M 2201/103; C10M 2201/0663; C10M 2201/1025; C10M 2203/0206; C10M 2203/1006; C10M 2205/163; C10M 2207/0406; C10M 2207/1285; C10M 2207/2815; C10M 2207/2835; C10M 2207/401; C10M 2213/046; C10M 2213/062; C10M 2215/0813; C10M 2223/103; C10M 2223/10; C10M 2229/1025; C10M 125/02; C10M 125/26; C10M 137/08; C10M 141/10; C10M 177/00; C10M 2210/02; C10N 2210/03; C10N 2210/04; C10N 2210/08; C10N 2220/082; C10N 2230/56; C10N 2250/10; C10N 2250/14; C10N 2270/00; B05D 3/007; C09D 7/1216; Y10T 428/2982
USPC ....... 508/113, 116, 151, 155, 167, 168, 230, 508/402
See application file for complete search history.

(56) References Cited

U.S. PATENT DOCUMENTS

| | | | |
|---|---|---|---|
| 3,883,314 | A | 5/1975 | Schnyder et al. |
| 4,105,571 | A | 8/1978 | Shaub et al. |
| 4,168,241 | A | 9/1979 | Kozima et al. |
| 4,223,958 | A | 9/1980 | Gray |
| 4,334,928 | A | 6/1982 | Hara et al. |
| 4,715,972 | A | 12/1987 | Pacholke |
| 4,745,010 | A | 5/1988 | Sarin et al. |
| 4,816,334 | A | 3/1989 | Yokoyama et al. |
| 4,877,677 | A | 10/1989 | Hirochi et al. |
| 5,129,918 | A | 7/1992 | Chattopadhay |
| 5,273,790 | A | 12/1993 | Herb et al. |
| 5,286,565 | A | 2/1994 | Holzi et al. |
| 5,328,875 | A | 7/1994 | Ueda et al. |
| 5,330,854 | A | 7/1994 | Singh et al. |
| 5,352,501 | A | 10/1994 | Miyamoto et al. |
| 5,363,821 | A | 11/1994 | Rao et al. |
| 5,389,118 | A | 2/1995 | Hinterman et al. |
| 5,391,422 | A | 2/1995 | Omori et al. |
| 5,407,464 | A | 4/1995 | Kaliski |
| 5,441,762 | A | 8/1995 | Gray et al. |
| 5,466,642 | A | 11/1995 | Tajima et al. |
| 5,478,622 | A | 12/1995 | Nakamura et al. |
| 5,500,331 | A | 3/1996 | Czekai et al. |
| 5,503,913 | A | 4/1996 | Konig et al. |
| 5,523,006 | A | 6/1996 | Strumban |
| 5,534,808 | A | 7/1996 | Takaki et al. |
| 5,536,577 | A | 7/1996 | Murayama et al. |
| 5,614,140 | A | 3/1997 | Pinneo |
| 5,671,532 | A | 9/1997 | Rao et al. |
| 5,677,060 | A | 10/1997 | Terentieva et al. |
| 5,704,556 | A | 1/1998 | McLaughlin |
| 5,766,783 | A | 6/1998 | Utsumi et al. |
| 5,800,866 | A | 9/1998 | Myers et al. |
| 5,830,577 | A | 11/1998 | Murayama et al. |
| 5,830,813 | A | 11/1998 | Yao et al. |
| 5,834,689 | A | 11/1998 | Cook |
| 5,882,777 | A | 3/1999 | Kukino et al. |
| 5,889,219 | A | 3/1999 | Moriguchi |
| 5,897,751 | A | 4/1999 | Makowiccki et al. |
| 5,902,671 | A | 5/1999 | Kutscher |
| 5,928,771 | A | 7/1999 | DeWald, Jr. et al. |
| 5,945,166 | A | 8/1999 | Singh et al. |
| 6,123,923 | A * | 9/2000 | Unger et al. .................. 424/9.52 |
| 6,146,645 | A | 11/2000 | Deckers et al. |
| 6,183,762 | B1 | 2/2001 | Deckers et al. |
| 6,196,910 | B1 | 3/2001 | Johnson et al. |
| 6,210,742 | B1 | 4/2001 | Deckers et al. |
| 6,217,843 | B1 | 4/2001 | Homyonfer et al. |
| 6,258,139 | B1 | 7/2001 | Jensen |
| 6,258,237 | B1 | 7/2001 | Gal-Or et al. |
| 6,267,989 | B1 | 7/2001 | Liversidge |
| 6,370,762 | B1 | 4/2002 | Li et al. |
| 6,372,012 | B1 | 4/2002 | Majagi et al. |
| 6,383,404 | B1 | 5/2002 | Sakai et al. |
| 6,395,634 | B1 | 5/2002 | Miyamoto |
| 6,410,086 | B1 | 6/2002 | Brandon et al. |
| 6,484,826 | B1 | 11/2002 | Anderson et al. |
| 6,540,800 | B2 | 4/2003 | Sherman et al. |
| 6,544,599 | B1 | 4/2003 | Brown et al. |
| 6,548,139 | B2 | 4/2003 | Sakai et al. |
| 6,548,264 | B1 | 4/2003 | Tan et al. |
| 6,607,782 | B1 | 8/2003 | Malshe et al. |
| 6,652,967 | B2 | 11/2003 | Yadav et al. |
| 6,709,622 | B2 | 3/2004 | Billiet et al. |
| 6,710,020 | B2 | 3/2004 | Tenne et al. |
| 6,878,676 | B1 | 4/2005 | Migdal et al. |
| 6,895,855 | B2 | 5/2005 | Doll |
| 6,933,049 | B2 | 8/2005 | Wan et al. |
| 6,933,263 | B2 | 8/2005 | Manka et al. |
| 6,945,699 | B2 | 9/2005 | Tibbits |
| 6,951,583 | B2 | 10/2005 | Clere et al. |
| 6,962,895 | B2 | 11/2005 | Scharf et al. |
| 6,962,946 | B2 | 11/2005 | Brady et al. |
| 6,976,647 | B2 | 12/2005 | Reed et al. |
| 7,018,606 | B2 | 3/2006 | Tenne et al. |

(56) References Cited

U.S. PATENT DOCUMENTS

| | | |
|---|---|---|
| 7,018,958 B2 | 3/2006 | Arrowsmith et al. |
| 7,022,653 B2 | 4/2006 | Hartley et al. |
| 7,244,498 B2 | 7/2007 | Cook et al. |
| 7,335,245 B2 | 2/2008 | He et al. |
| 7,371,474 B1 | 5/2008 | Liu et al. |
| 7,372,615 B2 | 5/2008 | Chen et al. |
| 7,374,473 B2 | 5/2008 | Kumasaka et al. |
| 7,375,060 B2 | 5/2008 | Kuzmin et al. |
| 7,387,813 B2 | 6/2008 | Kumar et al. |
| 7,410,697 B2 | 8/2008 | Schneider et al. |
| 7,419,941 B2 | 9/2008 | Waynick |
| 7,430,359 B2 | 9/2008 | Chen et al. |
| 7,438,976 B2 | 10/2008 | He et al. |
| 7,449,432 B2 | 11/2008 | Lockwood et al. |
| 7,458,384 B1 | 12/2008 | Seal et al. |
| 7,463,404 B2 | 12/2008 | Chen et al. |
| 7,470,650 B2 | 12/2008 | Zhang et al. |
| 7,471,439 B2 | 12/2008 | Chen et al. |
| 7,494,907 B2 | 2/2009 | Brown et al. |
| 7,510,760 B2 | 3/2009 | Malshe et al. |
| 7,524,481 B2 | 4/2009 | Tenne et al. |
| 7,549,938 B2 | 6/2009 | Leighton et al. |
| 7,556,743 B2 | 7/2009 | Furman et al. |
| 7,571,774 B2 | 8/2009 | Shuster et al. |
| 7,580,174 B2 | 8/2009 | Chen et al. |
| 7,594,962 B2 | 9/2009 | Bujard et al. |
| 7,597,950 B1 | 10/2009 | Stellacci et al. |
| 7,614,270 B2 | 11/2009 | Luckey, Jr. et al. |
| 7,616,370 B2 | 11/2009 | Chen et al. |
| 7,641,886 B2 | 1/2010 | Tenne et al. |
| 7,687,112 B2 | 3/2010 | Buehler et al. |
| 7,704,125 B2 | 4/2010 | Roy et al. |
| 7,723,812 B2 | 5/2010 | Chen et al. |
| 7,749,562 B1 | 7/2010 | Lam et al. |
| 7,763,489 B2 | 7/2010 | Chen et al. |
| 7,767,632 B2 | 8/2010 | Esche, Jr. et al. |
| 7,768,366 B1 | 8/2010 | Patton et al. |
| 7,771,821 B2 | 8/2010 | Martin et al. |
| 7,790,658 B2 | 9/2010 | Sawyer et al. |
| 7,803,347 B2 | 9/2010 | Ajiri |
| 7,816,297 B2 | 10/2010 | Lee |
| 7,846,556 B2 | 12/2010 | Erdemir et al. |
| 7,871,533 B1 | 1/2011 | Haiping et al. |
| 7,952,786 B2 | 5/2011 | Chen et al. |
| 7,955,857 B2 | 6/2011 | Bastide et al. |
| 7,959,891 B2 | 6/2011 | Tenne et al. |
| 7,968,505 B2 | 6/2011 | Liu et al. |
| 7,994,105 B2 | 8/2011 | Narayan |
| 7,998,572 B2 | 8/2011 | McGilvray et al. |
| 8,048,526 B2 | 11/2011 | Mizrahi |
| 8,071,160 B2 | 12/2011 | Chinn et al. |
| 8,074,906 B2 | 12/2011 | Talton |
| 8,075,792 B1 | 12/2011 | Branz et al. |
| 8,076,809 B2 | 12/2011 | Tingler et al. |
| 8,114,373 B2 | 2/2012 | Jang et al. |
| 8,117,902 B2 | 2/2012 | Santore et al. |
| 8,221,828 B2 | 7/2012 | Chinn et al. |
| 8,322,754 B2 | 12/2012 | Carcagno et al. |
| 8,476,206 B1 | 7/2013 | Malshe |
| 8,486,870 B1 | 7/2013 | Malshe |
| 8,492,319 B2 | 7/2013 | Malshe et al. |
| 2004/0076572 A1* | 4/2004 | Clere et al. ............ 423/290 |
| 2005/0002970 A1 | 1/2005 | Ketelson et al. |
| 2005/0065044 A1* | 3/2005 | Migdal et al. ......... 508/230 |
| 2005/0124504 A1 | 6/2005 | Zhang et al. |
| 2005/0191357 A1 | 9/2005 | Kawashima et al. |
| 2005/0287348 A1 | 12/2005 | Faler |
| 2005/0288192 A1 | 12/2005 | Alexander |
| 2006/0025515 A1 | 2/2006 | Scaringe et al. |
| 2006/0040832 A1* | 2/2006 | Zhang et al. ......... 508/113 |
| 2006/0056752 A1 | 3/2006 | Tibbits |
| 2006/0120947 A1 | 6/2006 | Tenne et al. |
| 2006/0258875 A1 | 11/2006 | Reyes et al. |
| 2007/0004602 A1 | 1/2007 | Waynick |
| 2007/0158609 A1 | 7/2007 | Hong et al. |
| 2007/0158610 A1 | 7/2007 | Hong et al. |
| 2007/0262120 A1 | 11/2007 | Coleman et al. |
| 2007/0293405 A1 | 12/2007 | Zhang et al. |
| 2008/0029625 A1 | 2/2008 | Talton |
| 2008/0050450 A1 | 2/2008 | Arnold et al. |
| 2008/0066375 A1 | 3/2008 | Roos et al. |
| 2008/0161213 A1 | 7/2008 | Jao et al. |
| 2008/0234149 A1 | 9/2008 | Malshe et al. |
| 2008/0269086 A1 | 10/2008 | Adhvaryu |
| 2008/0287326 A1 | 11/2008 | Zhang et al. |
| 2009/0014691 A1* | 1/2009 | Kint et al. ............... 252/500 |
| 2009/0018037 A1 | 1/2009 | Mabuchi et al. |
| 2009/0042751 A1 | 2/2009 | Narayan |
| 2009/0048129 A1 | 2/2009 | Mabuchi et al. |
| 2009/0053268 A1 | 2/2009 | DePablo et al. |
| 2009/0074522 A1 | 3/2009 | Graham et al. |
| 2009/0118148 A1 | 5/2009 | Martin et al. |
| 2009/0155479 A1 | 6/2009 | Xiao et al. |
| 2009/0169745 A1 | 7/2009 | Nohr et al. |
| 2009/0170733 A1 | 7/2009 | Hwang et al. |
| 2009/0246285 A1 | 10/2009 | Stellacci et al. |
| 2010/0029518 A1 | 2/2010 | Markovitz et al. |
| 2010/0092663 A1 | 4/2010 | Ajiri |
| 2010/0099590 A1 | 4/2010 | Liu |
| 2010/0112073 A1 | 5/2010 | Sabliov et al. |
| 2010/0204072 A1 | 8/2010 | Kwon et al. |
| 2010/0227782 A1 | 9/2010 | Tenne et al. |
| 2010/0261625 A1 | 10/2010 | Hakamata |
| 2010/0298180 A1 | 11/2010 | Patel et al. |
| 2011/0052934 A1 | 3/2011 | Sugimoto et al. |
| 2011/0118156 A1 | 5/2011 | Ruhle et al. |
| 2011/0136708 A1 | 6/2011 | Mabuchi et al. |
| 2011/0166051 A1 | 7/2011 | Mizrahi et al. |
| 2011/0172132 A1 | 7/2011 | Branson et al. |
| 2011/0206596 A1 | 8/2011 | Tenne et al. |
| 2011/0229580 A1 | 9/2011 | Srivastava et al. |
| 2011/0244692 A1 | 10/2011 | Jeong et al. |
| 2011/0257054 A1 | 10/2011 | Baran, Jr. et al. |
| 2011/0287987 A1 | 11/2011 | Mordukhovich et al. |
| 2012/0032543 A1 | 2/2012 | Chakraborty et al. |
| 2014/0024565 A1 | 1/2014 | Malshe et al. |
| 2014/0038862 A1 | 2/2014 | Hague et al. |
| 2014/0212587 A1 | 7/2014 | Malshe |
| 2014/0364348 A1 | 12/2014 | Malshe |
| 2015/0132539 A1 | 5/2015 | Bailey |
| 2015/0361375 A1 | 12/2015 | Malshe |

FOREIGN PATENT DOCUMENTS

| | | |
|---|---|---|
| JP | 10130678 A | 5/1998 |
| JP | 10195473 A | 7/1998 |
| JP | 10330779 A | 12/1998 |
| JP | 2002-294272 | 10/2002 |
| JP | 2006-045350 | 2/2006 |
| WO | WO 95/02025 A1 | 1/1995 |
| WO | WO 98/24833 A1 | 6/1998 |
| WO | WO 2005/060648 | 7/2005 |
| WO | WO 2006/076728 | 7/2006 |
| WO | WO 2006/134061 | 12/2006 |
| WO | WO 2007/082299 | 7/2007 |
| WO | WO 2014/008006 | 1/2014 |

OTHER PUBLICATIONS

Dmytryshyn, S.L., et al., "Synthesis and characterization of vegetable oil derived esters: evaluation for their diesel additive properties", Bioresource Tech. (2004) 92:55-64.

Hsu, S.M., et al., "Boundary lubricating films: formation and lubrication mechanism", Tribology Int'l (2005) 38:305-312.

Hu, J.J. et al., "Synthesis and microstructural characterization of inorganic fullerene-like $MoS_2$ and graphite-$MoS_2$ hybrid nanoparticles", J. Mater. Res. (2006) 21(4):1033-1040.

Jiang, W. et al., "Cubic boron nitride (cBN) based nanocomposite coatings on cutting inserts with chip breakers for hard turning applications", Surface & Coatings Technology (2005) 200:1849-1854.

(56) References Cited

OTHER PUBLICATIONS

Li, B. et al., "Tribochemistry and antiwear mechanism of organic-inorganic nanoparticles as lubricant additives", Technology Letters (2006) 22(1):79-84.
Malshe, A.P. et al., "Nanostructured coatings for machining and wear-resistant applications", JOM (2002) 28-30.
Menezes, P.L. et al., "Studies on friction and transfer layer: role of surface texture", Tribology Letter (2006) 24(3):265-273.
Minami, I. et al., "Antiwear properties of phosphorous-containing compounds in vegetable oils", Tribology Letter (2002) 13(2):95-101.
Moshkovith, A. et al., "Friction of fullerene-like WS2 nanoparticles; effect of agglomeration", Tribology Letter (2006) 24(3):225-228.
Ozkan et al., "Femtosecond laser-induced periodic structure writing on diamond crystals and microclusters", Applied Physics Letters, vol. 75, No. 23, Dec. 6, 1999, pp. 3716-3718.
Rao, C.N.R. et al., "Inorganic nanotubes", Dalton Trans. (2003) 1-24.
Russell, W.C. et al., "CBN-TiN composite coating using a novel combinatorial method—structure and performance in metal cutting", J. Mfg. Sci. Eng. (2003) 125:431-434.
Spikes, H., The thickness, friction and wear of lubricant files, a PowerPoint presentation given at the SAE Powertrain & Fluid Systems Conference and Exhibition, San Antonio, Texas (Oct. 25, 2005).
Verma, A. et al., "Exploring mechanical synthesis of inorganic nanoparticles of MoS2 lubricant and its composite with organic medium for advanced manufacturing", ISNM (2006) Paper No. 33.
Wu, J.-H. et al., "Bio-inspired surface engineering and tribology of MoS2 overcoated cBN-TiN composite coating", Wear (2006) 261(5-6):592-599.
Yedave, S.N. et al., "Novel composite CBN-TiN coating; synthesis and performance analysis", J. Mfg. Processes (2003) 5(2):154-162.
Spalvins, T. "A review of recent advances in solid film lubrication", J. Vac. Sci. Technol/ A (1987) 5(2):212-219.
Canter, Dr. Neil, "EP nanoparticles-based lubricant package", Tribology & Lubrication Technology, Apr. 2009, pp. 12-17.
Demydov, Ph.D., Dmytro, "Progress Report (2nd Quarter) Advanced Lubrication for Energy Efficiency, Durability and Lower Maintenance Costs of Advanced Naval Components and Systems", NanoMech, LLC, prepared for Office of Naval Research for the period of Feb. 20, 2010-May 19, 2010, 34 pages.
Verma et al., "Tribological Behavior of Deagglomerated Active Inorganic Nanoparticles for Advanced Lubrication", Tribology Transactions, Sep. 1, 2008, 51: pp. 673-678.
Adhvaryu, Dr. Antanu, "Multi-component Nanoparticle Based Lubricant Additive to Improve Efficiency and Durability in Engines", Caterpillar Inc., Aug. 7, 2008, 27 pages.
Verma, Arpana, "Fundamental Understanding of the Synthesis and Tribological Behavior of Organic-Inorganic Nanoparticles", Dec. 2008, University of Arkansas, 147 pages.
Berdinsky et al., "Synthesis of MoS nanostructures from nano-size powder by thermal annealing", Electron Devices and Materials (2000), EDM (2000) Siberian Russian Student Workshops on Sep. 19-21, 2000, Piscataway, NJ, USA, pp. 20-28.
Cizaire et al., "Mechanisms of ultra-low friction by hollow inorganic fullerene-like MoS2 nanoparticles", Surface and Coatings Technology (2002) 160(2-3): pp. 282-287.
Huang et al., "Friction and wear properties of IF-M0S2 as additive in Paraffin oil," Tribology Letters, vol. 20, Nos. 3-4, Dec. 2005, pp. 247-250.
Rapoport et al., "Fullerene-like WS2 nanoparticles: superior lubricants for harsh conditions", Advanced Materials, Apr. 17, 2003, vol. 15, Nos. 7-8, pp. 651-655.
Hu, Xianguo, "On the size effect of molybdenum disulfide particles on tribological performance", Industrial Lubrication and Tribology, 2005, vol. 57, Issue 6, pp. 255-259.
Gustavsoon et al., Nanoparticle based and sputtered WS2 low-friction coatings—Differences and similarities with respect to friction mechanisms and tribofilm formulation, Surface and Coating Technology, vol. 232, pp. 616-626, Oct. 15, 2013.
JP Patent Office, Office Action dated May 25, 2015, from JP Patent Application No. 2014-095260 (with English Translation).
International Search Report, issued on Oct. 16, 2015 in PCT/US15/27925.
Supplemental European Extended Search Report and Search Opinion for EPO Patent Appln No. 07710113.7, dated Sep. 20, 2012.
English translation of JPO Office Action for Appln No. 2008-550538. dated Sep. 20, 2012.
USPTO Office Action for U.S. Appl. No. 11/074,597, dated Mar. 20, 2008.
USPTO Office Action for U.S. Appl. No. 11/074,597, dated Aug. 23, 2007.
USPTO Office Action for U.S. Appl. No. 11/074,597, dated Jan. 31, 2007.
USPTO Office Action for U.S. Appl. No. 12/007,555, dated Jan. 12, 2010.
USPTO Office Action for U.S. Appl. No. 12/007,555, dated Oct. 4, 2012.
U.S. Appl. No. 14/844,797, filed Sep. 3, 2015.

\* cited by examiner

NANOPARTICLE COMPOSITIONS AND METHODS FOR MAKING AND USING THE SAME

CROSS-REFERENCE TO RELATED APPLICATIONS

This patent application is a continuation application and claims the benefit of the filing date under 35 U.S.C. §120 of U.S. patent application Ser. No. 12/160,758, filed on Sep. 2, 2008, now U.S. Pat. No. 8,492,319, issued on Jul. 23, 2013. U.S. patent application Ser. No. 12/160,758 is a national stage filing under 35 U.S.C. §371 and claims priority to International Application No. PCT/US2007/060506, filed on Jan. 12, 2007. International Application No. PCT/US2007/060506 claims priority under 35 U.S.C. §119(e) to U.S. Provisional Patent Application No. 60/758,307, filed on Jan. 12, 2006. U.S. patent application Ser. Nos. 12/160,758 and 60/758,307 and International Application No. PCT/US2007/060506 are incorporated by reference herein.

STATEMENT REGARDING FEDERALLY SPONSORED RESEARCH OR DEVELOPMENT

This invention was made with U.S. government support under grant number NSF/DMI 0115532 awarded in part by the National Science Foundation. The U.S. government has certain rights in the invention.

BACKGROUND

Over the years, considerable effort has been expended to develop nanostructures that can be used as lubricants, coatings, or delivery mechanisms. New ways to improve nanoparticle compositions, their method of manufacture, and their use are sought.

SUMMARY

In one aspect, a composition is described, comprising solid lubricant nanoparticles and an organic medium.

In another aspect, nanoparticles comprising a layered material are disclosed.

In a further aspect, a method of producing a nanoparticle comprising milling layered materials is provided.

In yet another aspect, a method of making a lubricant is disclosed, in which the method comprises milling layered materials to form nanoparticles and incorporating the nanoparticles into a base to form a lubricant.

Other aspects will become apparent by consideration of the detailed description and accompanying drawings.

BRIEF DESCRIPTION OF THE DRAWINGS

FIG. 3(A) shows molybdenum disulfide as it is available, typically from about a few microns to submicron size. FIG. 3(B) shows molybdenum disulfide that has been ball milled in air for 48 hours. FIG. 3(C) is a high resolution electron microscopy image that shows molybdenum disulfide that has been ball milled in air for 48 hours. FIG. 3(D) is a high-resolution transmission electron microscopy (HRTEM) image that shows molybdenum disulfide that has been ball milled in air for 48 hours followed by ball milling in oil for 48 hours.

FIG. 4(A) is the XRD spectra for molybdenum disulfide that has been ball milled in air for 48 hours followed by ball milling in oil for 48 hours. FIG. 4(B) is the XRD spectra for molybdenum disulfide that has been ball milled in air for 48 hours. FIG. 4(C) is the XRD spectra for molybdenum disulfide that has not been ball milled.

FIG. 6 shows graphs and bar charts depicting tribological test data for different additives in paraffin oil.

FIG. 7(A) shows the close caged dense oval shaped architecture of molybdenum disulfide nanoparticles that have been ball milled in air for 48 hours. FIG. 7(B) shows the open ended oval shaped architecture of molybdenum disulfide nanoparticles that have been ball milled in air for 48 hours followed by ball milling in canola oil for 48 hours.

FIG. 9(A) shows paraffin oil without any nanoparticle composition additive. FIG. 9(B) shows paraffin oil with molybdenum disulfide nanoparticles that have been ball milled in air for 48 hours followed by ball milling in oil for 48 hours and treated with a phospholipid emulsifier.

DETAILED DESCRIPTION

Figure 1:
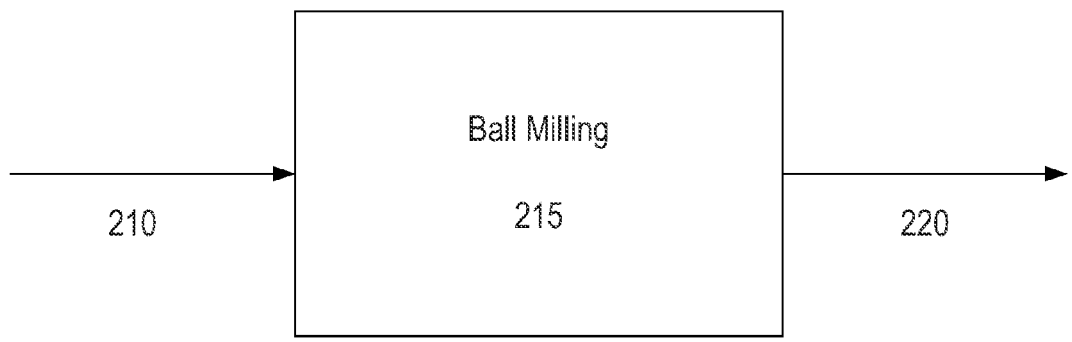
FIG. 1 is a diagram illustrating a method of producing solid lubricant nanoparticles.

Before any embodiments are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Any numerical range recited herein includes all values from the lower value to the upper value. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this application.

Herein described are compositions and methods for making compositions comprising solid lubricant nanoparticles and an organic medium. Also described are nanoparticles comprising layered materials. The nanoparticles may be solid lubricant nanoparticles. The nanoparticles may be made from starting materials or solid lubricant starting materials. Examples of solid lubricants may include, but are not limited to, layered materials, suitably chalcogenides, more suitably, molybdenum disulphide, tungsten disulphide, or a combination thereof. Another suitable layered material is graphite or intercalated graphite. Other solid lubricants that may be used alone or in combination with the layered materials are polytetrafluoroethylene (Teflon®), boron nitride (suitably hexagonal boron nitride), soft metals (such as silver, lead, nickel, copper), cerium fluoride, zinc oxide, silver sulfate, cadmium iodide, lead iodide, barium fluoride, tin sulfide, zinc phosphate, zinc sulfide, mica, boron nitrate, borax, fluorinated carbon, zinc phosphide, boron, or a combination thereof. Fluorinated carbons may be, without limitation, carbon-based materials such as graphite which has been fluorinated to improve its aesthetic characteristics. Such materials may include, for example, a material such as $CF_x$ wherein x ranges from about 0.05 to about 1.2. Such a material is produced by Allied Chemical under the trade name Accufluor.

The methods may include milling a solid lubricant feed. In one embodiment, the solid lubricant feed may be capable of being milled to particles comprising an average dimension of about 500 nanometers (submicron size) to about 10 nanometers. Suitably, the particles may have an average particle dimension of less than or equal to about 500 nanometers, suitably less than or equal to about 100 nanometers, suitably less than or equal to about 80 nanometers, and more suitably less than or equal to about 50 nanometers. Alternatively, the ball milling may result in milled solid lubricant particles comprising a mixture, the mixture comprising particles having an average particle dimension of less than or equal to about 500 nanometers, plus larger particles. Milling may include, among other things, ball milling and chemo mechanical milling. Examples of ball milling may include dry ball milling, wet ball milling, and combinations thereof. Ball milling may refer to an impaction process that may include two interacting objects where one object may be a ball, a rod, 4 pointed pins (jack shape), or other shapes. Chemo mechanical milling may refer to an impaction process that may form a complex between an organic medium and a nanoparticle. As a result of chemo mechanical milling, the organic medium may coat, encapsulate, or intercalate the nanoparticles.

In another embodiment, the solid lubricant feed may be dry milled and then wet milled. An emulsifier may be mixed with a base and added to the wet milled particles. Dry milling may refer to particles that have been milled in the presence of a vacuum, a gas, or a combination thereof. Wet milling may refer to particles that have been milled in the presence of a liquid.

The solid lubricant nanoparticle composition may further comprise an organic medium. Examples of organic mediums include, but are not limited to, oil mediums, grease mediums, alcohol mediums, or combinations thereof. Specific examples of organic mediums include, but are not limited to, composite oil, canola oil, vegetable oils, soybean oil, corn oil, ethyl and methyl esters of rapeseed oil, distilled monoglycerides, monoglycerides, diglycerides, acetic acid esters of monoglycerides, organic acid esters of monoglycerides, sorbitan, sorbitan esters of fatty acids, propylene glycol esters of fatty acids, polyglycerol esters of fatty acids, n-hexadecane, hydrocarbon oils, phospholipids, or a combination thereof. Many of these organic media may be environmentally acceptable.

The composition may contain emulsifiers, surfactants, or dispersants. Examples of emulsifiers may include, but are not limited to, emulsifiers having a hydrophilic-lipophilic balance (HLB) from about 2 to about 7; alternatively, a HLB from about 3 to about 5; or alternatively, a HLB of about 4. Other examples of emulsifiers may include, but are not limited to, lecithins, soy lecithins, phospholipids lecithins, detergents, distilled monoglycerides, monoglycerides, diglycerides, acetic acid esters of monoglycerides, organic acid esters of monoglycerides, sorbitan esters of fatty acids, propylene glycol esters of fatty acids, polyglycerol esters of fatty acids, compounds containing phosphorous, compounds containing sulfur, compounds containing nitrogen, or a combination thereof.

A method of making a lubricant is described. The composition may be used as an additive dispersed in a base. Examples of bases may include, but are not limited to, oils, greases, plastics, gels, sprays, or a combination thereof. Specific examples of bases may include, but are not limited to, hydrocarbon oils, vegetable oils, corn oil, peanut oil, canola oil, soybean oil, mineral oil, paraffin oils, synthetic oils, petroleum gels, petroleum greases, hydrocarbon gels, hydrocarbon greases, lithium based greases, fluoroether based greases, ethylenebistearamide, waxes, silicones, or a combination thereof.

Described herein is a method of lubricating or coating an object that is part of an end application with a composition comprising at least one of solid lubricant nanoparticles and an organic medium. Further described is a method of lubricating an object by employing the composition comprising solid lubricant nanoparticles and an organic medium as a delivery mechanism.

Disclosed herein are compositions and methods of preparing nanoparticle based lubricants that, among various advantages, display enhanced dispersion stability and resistance to agglomeration. FIG. 1 illustrates a method of preparing nanoparticle based lubricants or compositions. A solid lubricant feed is introduced via line 210 to a ball milling processor 215. Ball milling is carried out in the processor 215 and the solid lubricant feed is milled to comprise particles having an average particle dimension of less than or equal to about 500 nanometers, suitably less than or equal to about 100 nanometers, suitably less than or equal to about 80 nanometers, and more suitably less than or equal to about 50 nanometers. Alternatively, the ball milling may result in milled solid lubricant particles comprising a mixture, the mixture comprising particles having an average particle dimension of less than or equal to about 500 nanometers, plus larger particles. The ball milling may be high energy ball milling, medium energy ball milling, or combinations thereof. Additionally, in various embodiments the ball milling may be carried out in a vacuum, in the presence of a gas, in the presence of a liquid, in the presence of a second solid, or combinations thereof. The nanoparticle composition may be removed from the processor via line 220. The nanoparticle composition may be a nanoparticle based lubricant.

Figure 2:
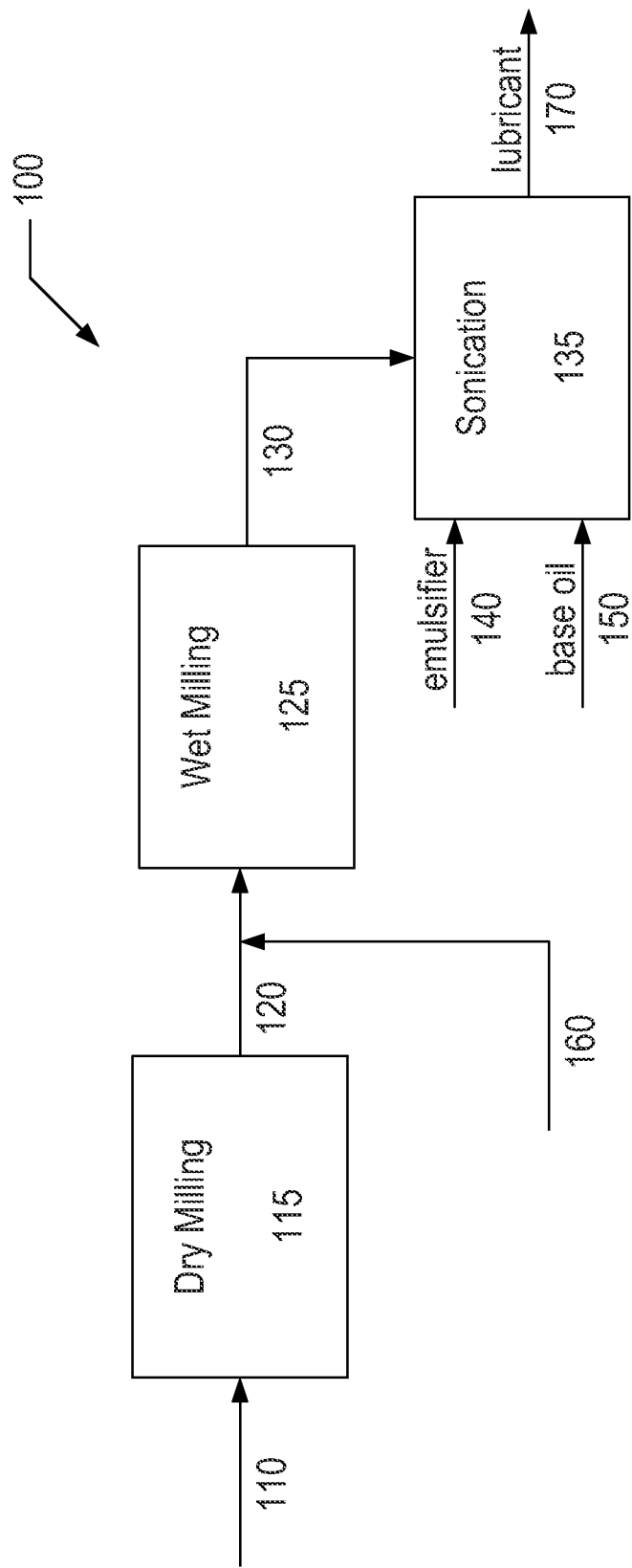
FIG. 2 is a diagram illustrating one method of preparing nanoparticle based lubricants.

In alternative embodiments, the ball milling may comprise a first ball milling and at least one more subsequent ball millings, or ball milling and/or other processing as appropriate. Suitably, the ball milling may comprise dry milling followed by wet milling. FIG. 2 illustrates a further method 100 of preparing nanoparticle based lubricants where dry milling is followed by wet milling. Feed 110 introduces a solid lubricant feed into a ball milling processor 115 where dry ball milling, such as in a vacuum or in air, reduces the solid lubricant feed to particles having an average dimension of the size described above. Line 120 carries the dry milled particles to a wet milling processor 125. Via line 160 the dry milled particles are combined with a composite oil or an organic medium prior to entering the wet milling processor 125. Alternatively, the organic medium and dry milled particles may be combined in the wet milling processor 125. In further alternative embodiments (not shown), the dry milling and wet milling may be carried out in a single processor where the organic medium is supplied to the single processor for wet milling after initially carrying out dry milling. In other alternative embodiments, the balls in the ball milling apparatus may be coated with the organic medium to incorporate the organic medium in the solid lubricant nanoparticles.

After wet milling, line 130 carries the wet milled particles to a container 135, which may be a sonication device. Alternatively, line 130 may carry a mixture comprising solid lubricant nanoparticles, organic medium, and a complex comprising the solid lubricant nanoparticles combined with an organic medium.

In another embodiment, prior to introduction of the wet milled particles into the container 135, a base may be fed to the container 135 via line 150. Alternatively, the base may be supplied to the wet milling processor 125 and the mixing, which may include sonicating, may be carried out in the wet milling processor 125. In such embodiments the solid lubricant nanoparticle composition may be employed as an additive and dispersed in the base. A base may be paired with a solid lubricant nanoparticle composition according to the ability of the base and the solid lubricant nanoparticle composition to blend appropriately. In such cases the solid lubricant nanoparticle composition may enhance performance of the base.

In a further embodiment, an emulsifier may be mixed with the base. Emulsifiers may further enhance dispersion of the solid lubricant nanoparticle composition in the base. The emulsifier may be selected to enhance the dispersion stability of a nanoparticle composition in a base. An emulsifier may also be supplied to the container 135 via line 140. In many embodiments, the emulsifier and base are combined in the container 135 prior to introduction of the wet milled particles. Prior mixing of the emulsifier with the base may enhance dispersion upon addition of complexes of solid lubricant nanoparticles and organic medium and/or solid lubricant nanoparticles by homogeneously dispersing/dissolving the complexes/nanoparticles. In some embodiments, the mixing of the emulsifier and base may comprise sonicating. Alternatively, the emulsifier may be supplied to the wet milling processor 125 and the mixing, which may include sonicating, may be carried out in the wet milling processor 125. The lubricant removed from the container 135 via line 120 may be a blend comprising the wet milled particles, organic medium, and base. The blend may further comprise an emulsifier. In other alternative embodiments, additives may be added to the nanoparticle based lubricant during interaction with a mating surface.

In a further embodiment, antioxidants or anticorrosion agents may be milled with the solid lubricant nanoparticles. Examples of antioxidants include, but are not limited to, hindered phenols, alkylated phenols, alkyl amines, aryl amines, 2,6-di-tert-butyl-4-methylphenol, 4,4'-di-tert-octyl-diphenylamine, tert-Butyl hydroquinone, tris(2,4-di-tert-butylphenyl)phosphate, phosphites, thioesters, or a combination thereof. Examples of anticorrosion agents include, but are not limited to, alkaline-earth metal bisalkylphenolsulphonates, dithiophosphates, alkenylsuccinic acid half-amides, or a combination thereof. In another embodiment, biocidals may be milled with the solid lubricant nanoparticles. Examples of biocidals may include, but are not limited to, alkyl or hydroxylamine benzotriazole, an amine salt of a partial alkyl ester of an alkyl, alkenyl succinic acid, or a combination thereof.

In yet another embodiment, further processing of wet milled particles may comprise removal of oils that are not a part of a complex with the solid lubricant particles. Such methods may be suitable for applications that benefit from use of dry particles of solid lubricant, such as coating applications. Oil and/or other liquids can be removed from wet milled particles to produce substantially dry solid lubricant particles and complexes. Such wet milling followed by drying may produce a solid lubricant with reduced tendency to agglomerate. In specific embodiments, an agent, such as acetone, can be added that dissolves oils that are not a part of a complex, followed by a drying process such as super-critical drying, to produce a substantially dry solid lubricant comprising particles treated by milling in an organic medium.

Ball milling conditions may vary and, in particular, conditions such as temperature, milling time, and size and materials of the balls and vials may be manipulated. In various embodiments, ball milling may be carried out from about 12 hours to about 50 hours, suitably from about 36 hours to about 50 hours, suitably from about 40 hours to about 50 hours, and more suitably at about 48 hours. Suitably, ball milling is conducted at room temperature. The benefits of increasing milling time may comprise at least one of increasing the time for the organic medium and solid lubricant nanoparticles to interact; and producing finer sizes, better yield of nanoparticles, more uniform shapes, and more passive surfaces. An example of ball milling equipment suitable for carrying out the described milling includes the SPEX CertiPrep model 8000D, along with hardened stainless steel vials and hardened stainless steel grinding balls, but any type of ball milling apparatus may be used. In one embodiment, a stress of 600-650 MPa, a load of 14.9 N, and a strain of $10^{-3}$-$10^{-4}$ per sec may be used.

The proportions of the components in a nanoparticle based lubricant may contribute to performance of the lubricant, such as the lubricants dispersion stability and ability to resist agglomeration. In wet milling, suitable ratios of solid lubricant nanoparticles to organic medium may be about 1 part particles to about 4 parts organic medium by weight, suitably, about 1 part particles to about 3 parts organic medium by weight, suitably, about 3 parts particles to about 8 parts organic medium by weight, suitably, about 2 parts particles to about 4 parts organic medium by weight, suitably, about 1 part particles to about 2 parts organic medium by weight, and suitably, about 1 part particles to about 1.5 parts organic medium by weight.

Suitable ratios of organic medium to emulsifier in a lubricant including the solid lubricant nanoparticles may be about 1 part organic medium to less than or equal to about 1 part emulsifier, suitably, about 1 part organic medium to about 0.5 parts emulsifier by weight, or suitably, from about 0.4 to about 1 part emulsifier for about 1 part organic medium by weight.

The amount of solid lubricant nanoparticle composition (by weight) sonicated or dispersed in the base may be from about 0.25% to about 5%, suitably 0.5% to about 3%, suitably 0.5% to about 2%, and more suitably 0.75% to about 2%.

The amount of emulsifier (by weight) sonicated or dissolved in the base, depending on the end application, shelf-life, and the like, may be from about 0.5% to about 10%, suitably from about 4% to about 8%, suitably from about 5% to about 6%, and suitably, from about 0.75% to about 2.25%.

The solid lubricant nanoparticle composition may be used, without limitation, as lubricants, coatings, delivery mechanisms, or a combination thereof. The solid lubricant nanoparticle composition may be used, without limitation, as an additive dispersed in a base oil. The composition may also be used, without limitation, to lubricate a boundary lubrication regime. A boundary lubrication regime may be a lubrication regime where the average oil film thickness may be less than the composite surface roughness and the surface asperities may come into contact with each other under relative motion. During the relative motion of two surfaces with lubricants in various applications, three different lubrication stages may occur, and the boundary lubrication regime may be the most severe condition in terms of temperature, pressure and speed. Mating parts may be exposed to severe contact conditions of high load, low velocity, extreme pressure (for example, 1-2 GPa), and high local temperature (for example, 150-300 degrees C.). The boundary lubrication regime may also exist under lower pressures and low sliding velocities or high temperatures. In the boundary lubrication regime, the mating surfaces may be in direct physical contact. The composition may further be used, without limitation, as a lubricant or coating in machinery applications, manufacturing applications, mining applications, aerospace applications, automotive applications, pharmaceutical applications, medical applications, dental applications, cosmetic applications, food product applications, nutritional applications, health related applications, bio-fuel applications or a combination thereof. Specific examples of uses in end applications include, without limitation, machine tools, bearings, gears, camshafts, pumps, transmissions, piston rings, engines, power generators, pin-joints, aerospace systems, mining equipment, manufacturing equipment, or a combination thereof. Further specific examples of uses may be, without limitation, as an additive in lubricants, greases, gels, compounded plastic parts, pastes, powders, emulsions, dispersions, or combinations thereof. The composition may also be used as a lubricant that employs the solid lubricant nanoparticle composition as a delivery mechanism in pharmaceutical applications, medical applications, dental applications, cosmetic applications, food product applications, nutritional applications, health related applications, bio-fuel applications, or a combination thereof. The various compositions and methods may also be used, without limitation, in hybrid inorganic-organic materials. Examples of applications using inorganic-organic materials, include, but are not limited to, optics, electronics, ionics, mechanics, energy, environment, biology, medicine, smart membranes, separation devices, functional smart coatings, photovoltaic and fuel cells, photocatalysts, new catalysts, sensors, smart microelectronics, micro-optical and photonic components and systems for nanophotonics, innovative cosmetics, intelligent therapeutic vectors that combined targeting, imaging, therapy, and controlled release of active molecules, and nanoceramic-polymer composites for the automobile or packaging industries.

Figure 7:
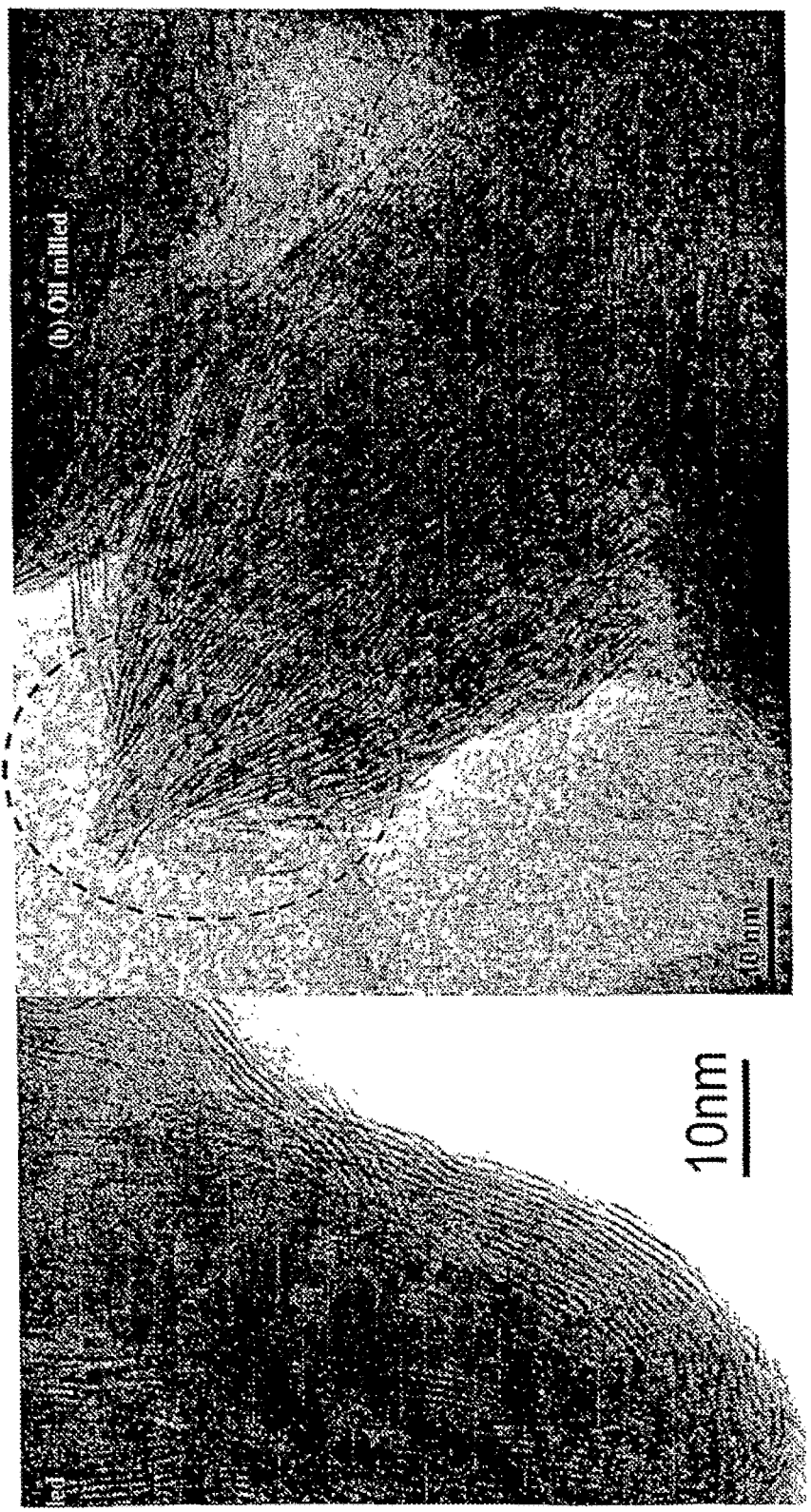
FIG. 7 is a TEM image showing the architecture of molybdenum disulfide nanoparticles (15-70 nm average size).
Figure 8:
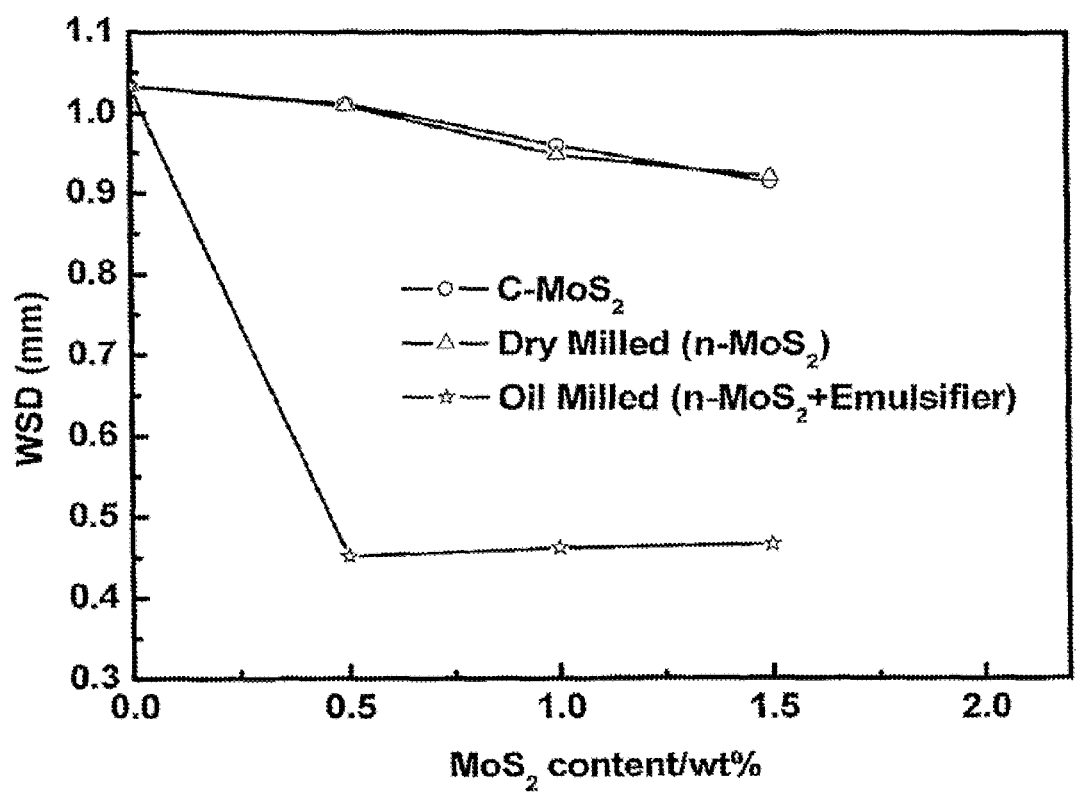
FIG. 8 is a graph depicting a comparison of wear scar diameters for different additives in paraffin oil. One additive is crystalline molybdenum disulfide (c-$MoS_2$). Another is molybdenum disulfide nanoparticles that were ball milled in air (n-$MoS_2$). Another additive is molybdenum disulfide nanoparticles that were ball milled in air followed by ball milling in canola oil and to which a phospholipid emulsifier was added (n-$MoS_2$+Emulsifier).

In some embodiments, the ball milling process may create a close caged dense oval shaped architecture (similar to a football shape or fullerene type architecture). This may occur when molybdenum disulphide is milled in a gas or vacuum. FIG. 7(A) shows the close caged dense oval shaped architecture of molybdenum disulphide nanoparticles that have been ball milled in air for 48 hours.

In other embodiments, the ball milling process may create an open ended oval shaped architecture (similar to a coconut shape) of molybdenum disulphide nanoparticles which are intercalated and encapsulated with an organic medium and phospholipids. This may occur when molybdenum disulphide is milled in a gas or vacuum followed by milling in an organic medium. FIG. 7(B) shows the open ended oval shaped architecture of molybdenum disulphide nanoparticles that have been ball milled in air for 48 hours followed by ball milling in canola oil for 48 hours.

As shown in the examples, the tribological performance of the nanoparticle based lubricant may be improved. The tribological performance may be measured by evaluating different properties. An anti-wear property may be a lubricating fluid property that has been measured using the industry standard Four-Ball Wear (ASTM D4172) Test. The Four-Ball Wear Test may evaluate the protection provided by an oil under conditions of pressure and sliding motion. Placed in a bath of the test lubricant, three fixed steel balls may be put into contact with a fourth ball of the same grade in rotating contact at preset test conditions. Lubricant wear protection properties may be measured by comparing the average wear scars on the three fixed balls. The smaller the average wear scar, the better the protection. Extreme pressure properties may be lubricating fluid properties that have been measured using the industry standard Four-Ball Wear (ASTM D2783) Test. This test method may cover the determination of the load-carrying properties of lubricating fluids. The following two determinations may be made: 1) load-wear index (formerly Mean-Hertz load) and 2) weld load (kg). The load-wear index may be the load-carrying property of a lubricant. It may be an index of the ability of a lubricant to minimize wear at applied loads. The weld load may be the lowest applied load in kilograms at which the rotating ball welds to the three stationary balls, indicating the extreme pressure level that the lubricants can withstand. The higher the weld point scores and load wear index values, the better the anti-wear and extreme pressure properties of a lubricant. The coefficient of friction (COF) may be a lubricating fluid property that has been measured using the industry standard Four-Ball Wear (ASTM D4172) Test. COF may be a dimensionless scalar value which describes the ratio of the force of friction between two bodies and the force pressing them together. The coefficient of friction may depend on the materials used. For example, ice on metal has a low COF, while rubber on pavement has a high COF. A common way to reduce friction may be by using a lubricant, such as oil or water, which is placed between two surfaces, often dramatically lessening the COF.

The composition may have a wear scar diameter of about 0.4 mm to about 0.5 mm. The composition may have a COF of about 0.06 to about 0.08. The composition may have a weld load of about 150 kg to about 350 kg. The composition may have a load wear index of about 20 to about 40. The values of these tribological properties may change depending on the amount of solid lubricant nanoparticle composition sonicated or dissolved in the base.

Various features and aspects of the invention are set forth in the following examples, which are intended to be illustrative and not limiting.

EXAMPLES

Example 1

Ball milling was performed in a SPEX 8000D machine using hardened stainless steel vials and balls. $MoS_2$ (Alfa Aesar, 98% pure, 700 nm average primary particle size) and canola oil (Crisco) were used as the starting materials in a ratio of 1 part $MoS_2$ (10 grams) to 2 parts canola oil (20 grams). The ball to powder weight ratio was 2 to 1. $MoS_2$ was ball milled for 48 hours in air followed by milling in canola oil for 48 hrs at room temperature. The nanoparticles were about 50 nm after ball milling. Table 1 summarizes milling conditions and resultant particle morphologies. It was observed that there was a strong effect of milling media on the shape of the ball milled nanoparticles. Dry milling showed buckling and folding of the planes when the particle size was reduced from micron size to nanometer size. However, the dry milling condition used here produced micro clusters embedding several nanoparticles. On the other hand, wet milling showed no buckling but saw de-agglomeration.

TABLE 1

Milling conditions and parametric effect on particle size and shape

| | Shape of the particles | Shape of the clusters |
|---|---|---|
| Dry Milling | | |
| 12 hours | Plate-like with sharp edges | Sharp and irregular |
| 24 hours | Plate-like with round edges | More or less rounded |
| 48 hours | Spherical | Globular clusters |
| Wet Milling | | |
| 12 hours | Thin plates with sharp edges | Thing plates with sharp edges |
| 24 hours | Thin plates with sharp edges | Thin plates with sharp edges |
| 48 hours | Thin plates with sharp edges | Thin plates with sharp edges |

TABLE 2

Effect of milling media on resultant size (starting size sub-micron), shape, and agglomeration of particles

| Properties | Dry | Alcohol | Oil | Dry milled and oil milled |
|---|---|---|---|---|
| Clusters size (nm) | 100 | 300 | 200 | 100 |
| Particle size (nm) | 30 | 80 | 80 | 30 |
| Agglomeration | High | Very less | Very less | Very less |
| Shape of the particles | Spherical | Platelet | Platelet | Spherical |

Figure 3:
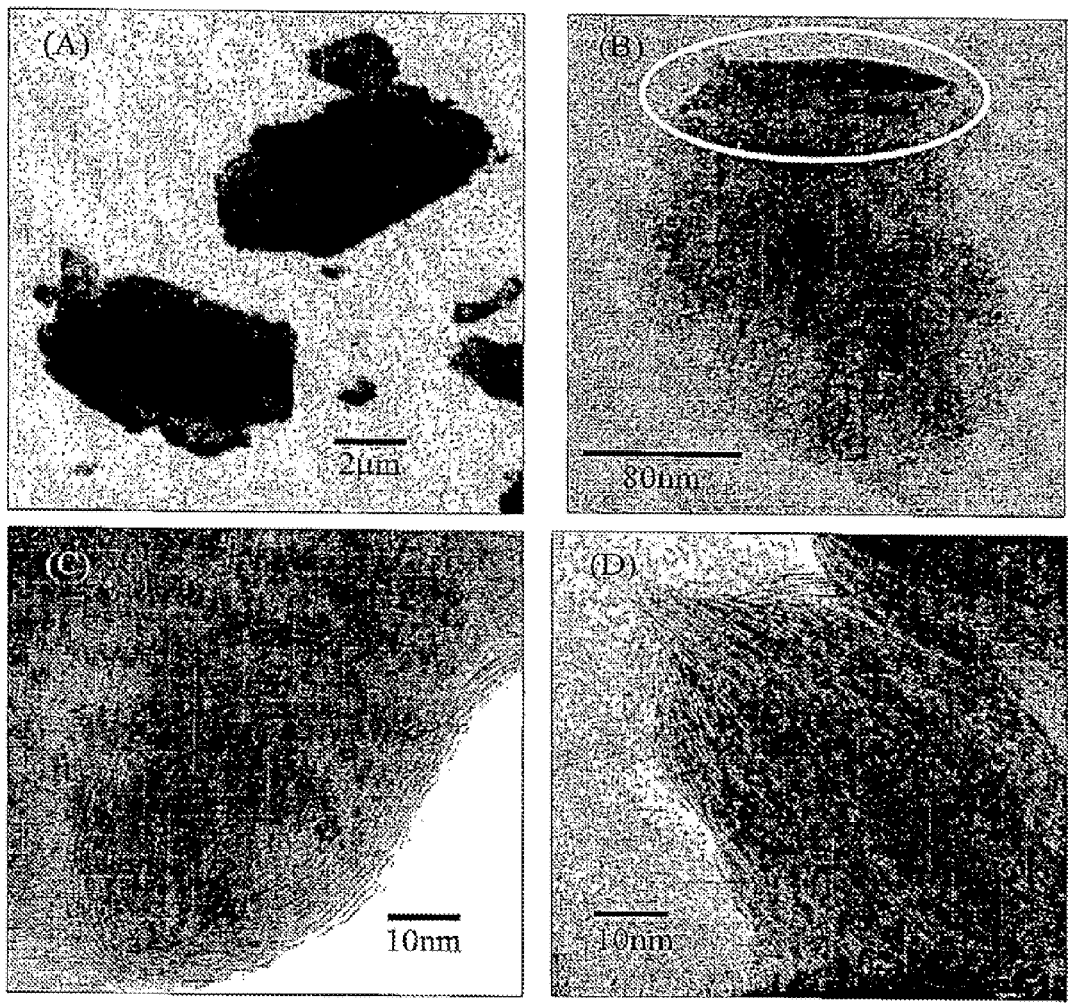
FIG. 3 shows transmission electron microscopy (TEM) micrographs of molybdenum disulfide particles.

FIG. 3 shows TEM micrographs of the as-available (700 nm), air milled, and hybrid milled (48 hrs in air medium followed by 48 hours in oil medium) $MoS_2$ nanoparticles. FIG. 3(A) represents micron-sized particle chunks of the as-available $MoS_2$ sample off the shelf. These micrographs, particularly FIG. 3(B), represent agglomerates of lubricant nanoparticles when milled in the air medium. FIG. 3(B) clearly demonstrates size reduction in air milled $MoS_2$. Higher magnification (circular regions) revealed formation of the disc shaped nanoparticles after milling in the air medium. From FIGS. 3(C) and 3(D) it may be concluded that the particle size was reduced to less than 30 nm after milling in air and hybrid conditions. Regardless of the occasionally observed clusters, the average size of the clusters is less than or equal to 200 nm.

Hybrid milled samples were dispersed in paraffin oil (from Walmart) and remained suspended without settling. However, the dispersion was not uniform after a few weeks. To stabilize the dispersion and extend the anti-wear properties, phospholipids were added. Around 2% by weight of soy lecithin phospholipids (from American Lecithin) was added in the base oil.

Figure 4:
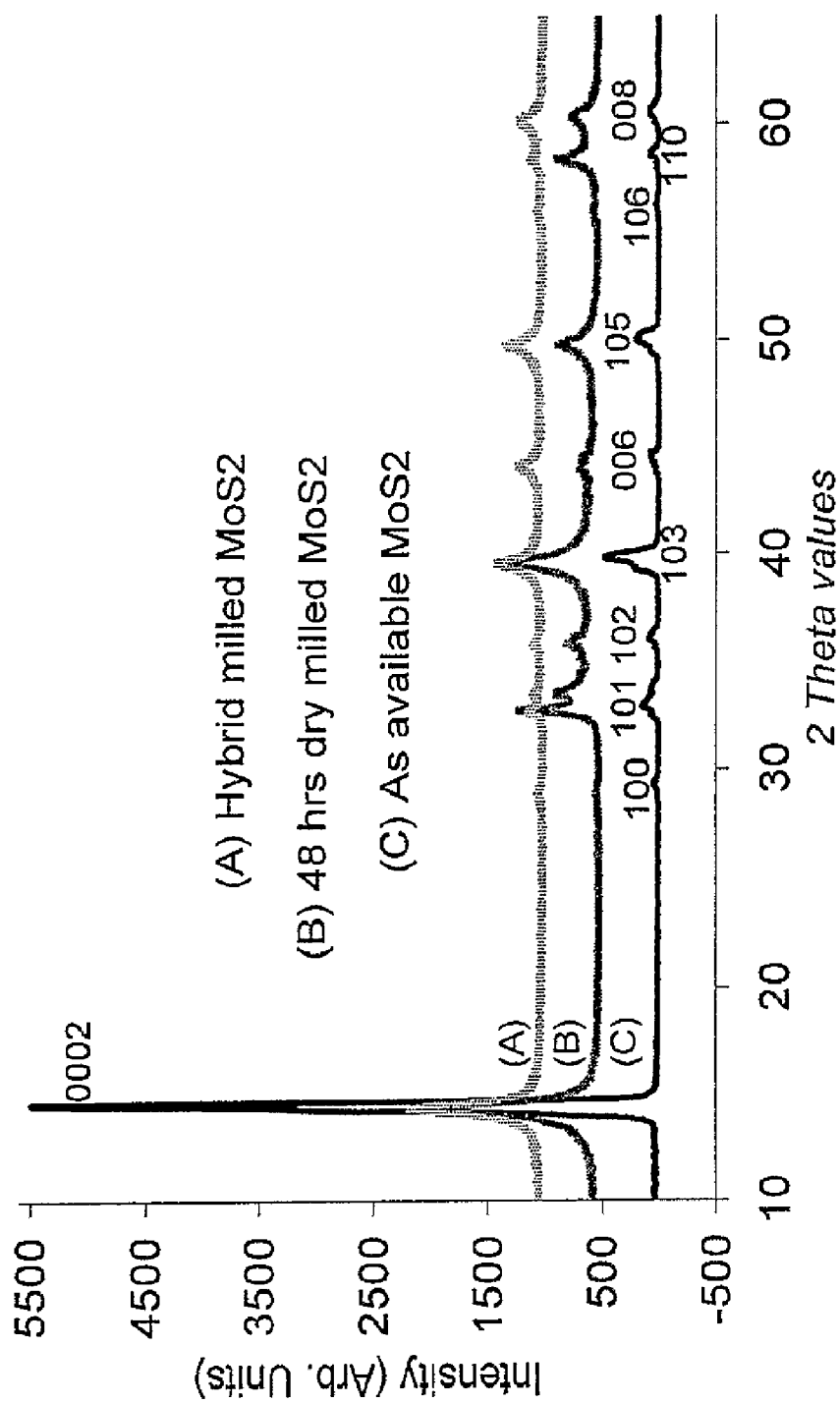
FIG. 4 is a graph showing XRD spectra of molybdenum disulfide particles.
Figure 5:
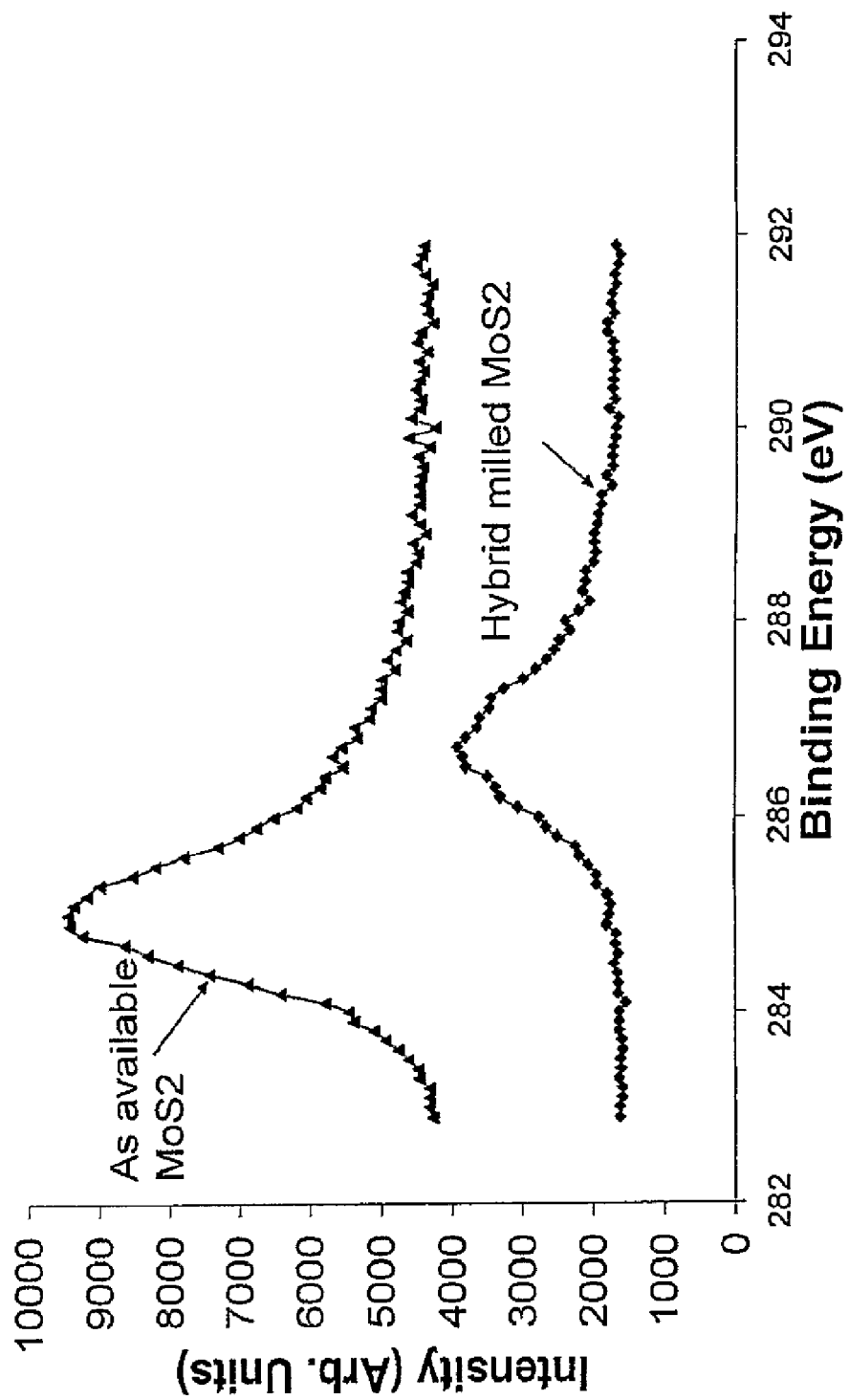
FIG. 5 is a graph showing XPS spectra of molybdenum disulfide particles in which the carbon peak for molybdenum disulfide that has not been ball milled is shown, as well as the carbon peak for molybdenum disulfide that has been ball milled in air for 48 hours, followed by ball milling in oil for 48 hours.

FIGS. 4 and 5 show the XRD and XPS spectra of $MoS_2$ before and after ball milling, respectively. XRD spectra revealed no phase change as well as no observable amorphization in the $MoS_2$ after milling. This observation is consistent with the continuous platelets observed throughout the nanoparticle matrix in TEM analysis for milled material. Broadening of peaks (FWHM) was observed in XRD spectra of $MoS_2$ ball milled in air and hybrid media, respectively. The peak broadening may be attributed to the reduction in particle size. The estimated grain size is 6 nm. This follows the theme of ball milling where clusters consist of grains and sub-grains of the order of 10 nm XPS analysis was carried out to study the surface chemistry of the as-available and hybrid milled $MoS_2$ nanoparticles. As shown in FIG. 5, a carbon (C) peak observed at 285 eV in the as-available $MoS_2$ sample shifted to 286.7 eV. Bonding energies of 286 eV and 287.8 eV correspond to C—O and C=O bond formation, respectively. The observed binding energy level may demonstrate that a thin layer containing mixed C—O & C=O groups enfolds the $MoS_2$ particles.

Preliminary tribological tests on the synthesized nanoparticles were performed on a four-ball machine by following ASTM 4172. The balls used were made of AISI 52100 stainless steel and were highly polished. Four Ball Wear Scar measurements using ASTM D4172 were made under the following test conditions:

| Test Temperature, ° C. | 75 (±1.7) |
|---|---|
| Test Duration, min | 60 (±1) |
| Spindle Speed, rpm | 1,200 (±60) |
| Load, kg | 40 (±0.2) |

Wear scar diameter (WSD, m) of each stationary ball was quantified in both vertical and horizontal directions. The average value of WSD from 3 independent tests was reported within ±0.03 mm accuracy.

Four Ball Extreme Pressure measurements using ASTM D2783 were made under the following test conditions:

| Test Temperature, ° C. | 23 |
|---|---|
| Test Duration, min | 60 (±1) |
| Spindle Speed, rpm | 1,770 (±60) |
| Load, kg | Varies, 10-sec/stage |

-continued

| Ball Material | AISI-E52100 |
|---|---|
| Hardness | 64-66 |
| Grade | 25EP |

Figure 6A:
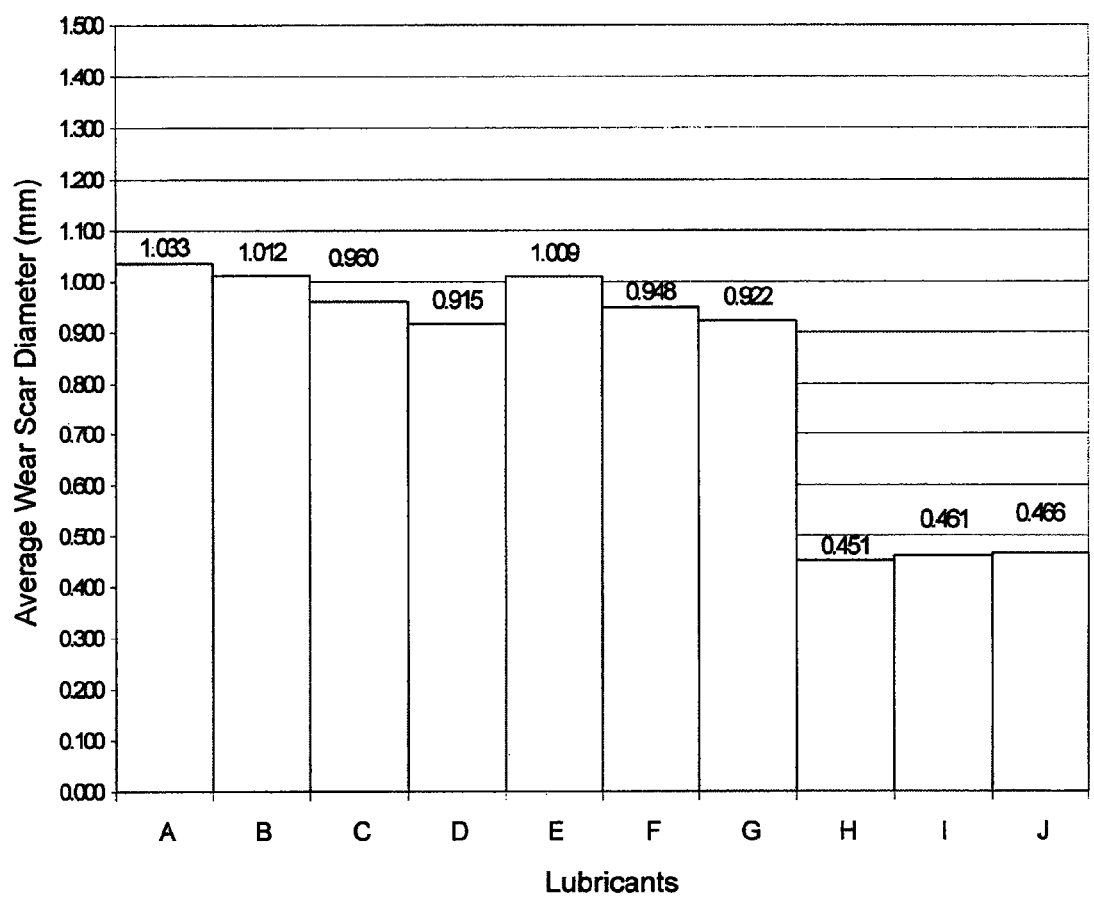
FIG. 6(A) shows the average wear scar diameter for a base oil (paraffin oil), paraffin oil with micron sized $MoS_2$, paraffin oil with $MoS_2$ that was milled in air for 48 hours, and paraffin oil with $MoS_2$ that was milled in air for 48 hours followed by milling in canola oil for 48 hours.
Figure 6B:
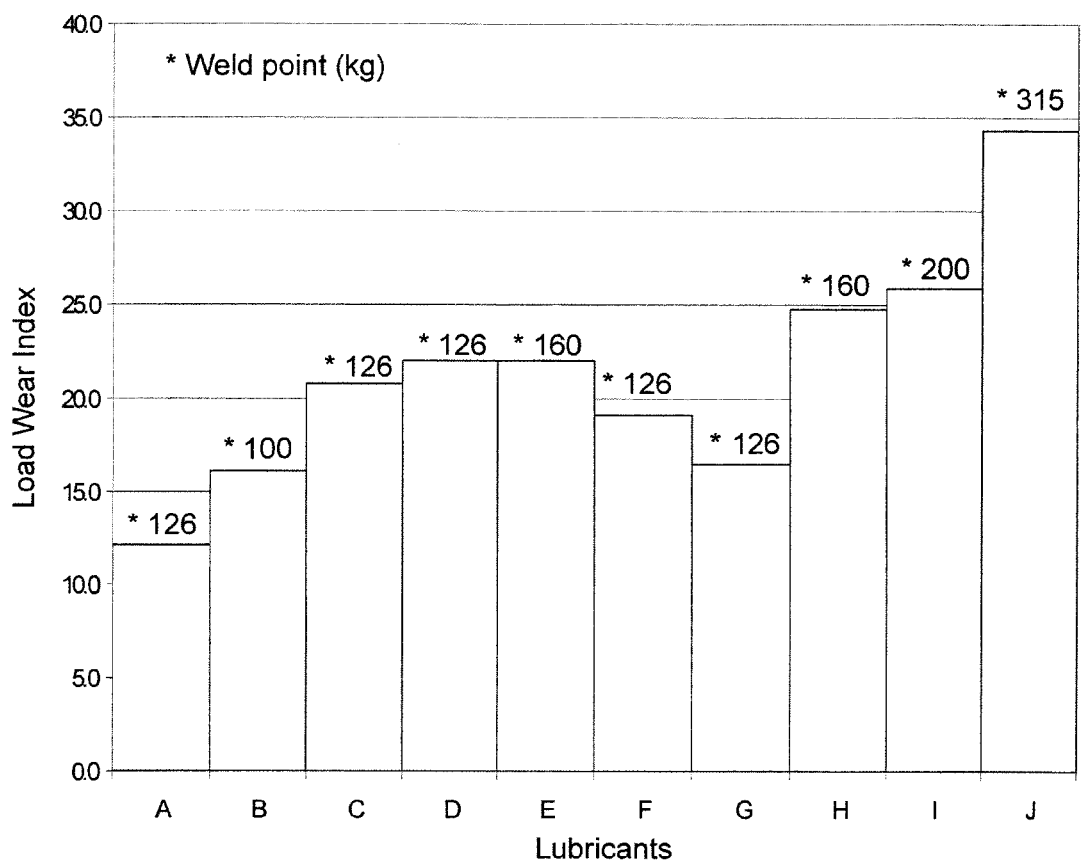
FIG. 6(B) shows the load wear index for paraffin oil without a nanoparticle additive, paraffin oil with micron sized $MoS_2$, paraffin oil with $MoS_2$ that was milled in air for 48 hours, and paraffin oil with $MoS_2$ that was milled in air for 48 hours followed by milling in canola oil for 48 hours.
Figure 6C:
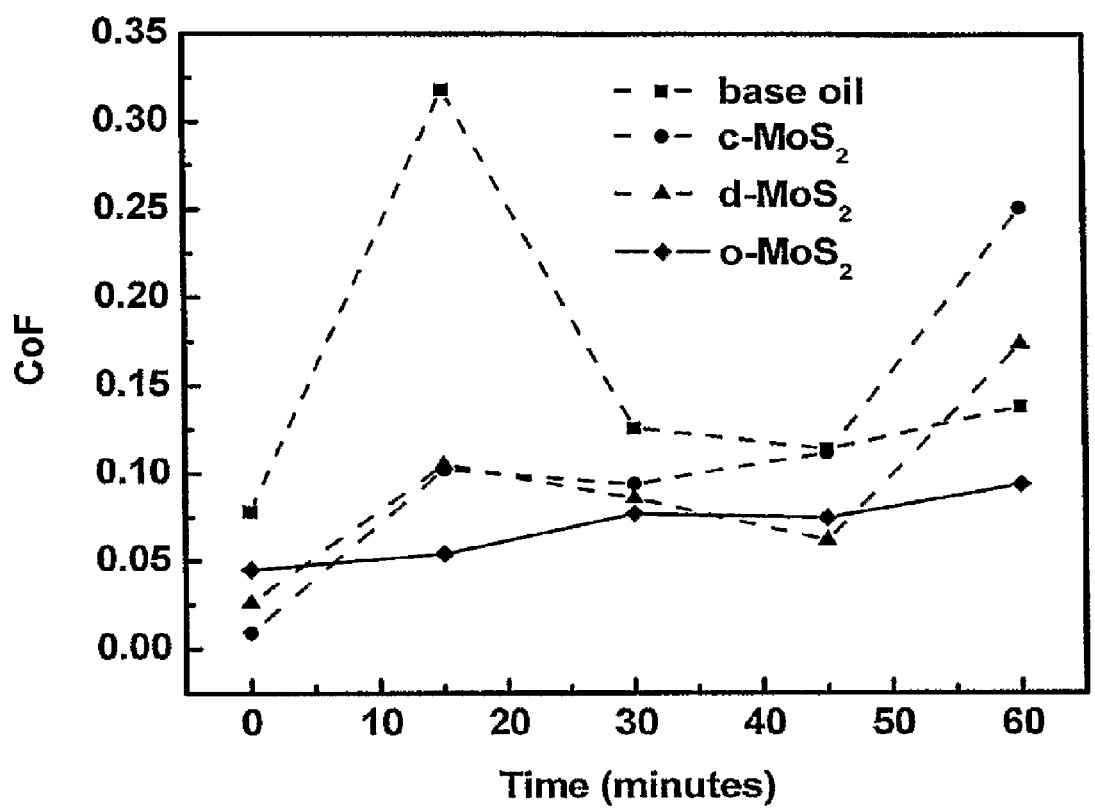
FIG. 6(C) shows the coefficient of friction for paraffin oil without a nanoparticle additive, paraffin oil with micron sized $MoS_2$ (c-$MoS_2$), paraffin oil with $MoS_2$ that was milled in air for 48 hours (d-$MoS_2$), and paraffin oil with $MoS_2$ that was milled in air for 48 hours followed by milling in canola oil for 48 hours (n-$MoS_2$).
Figure 6D:
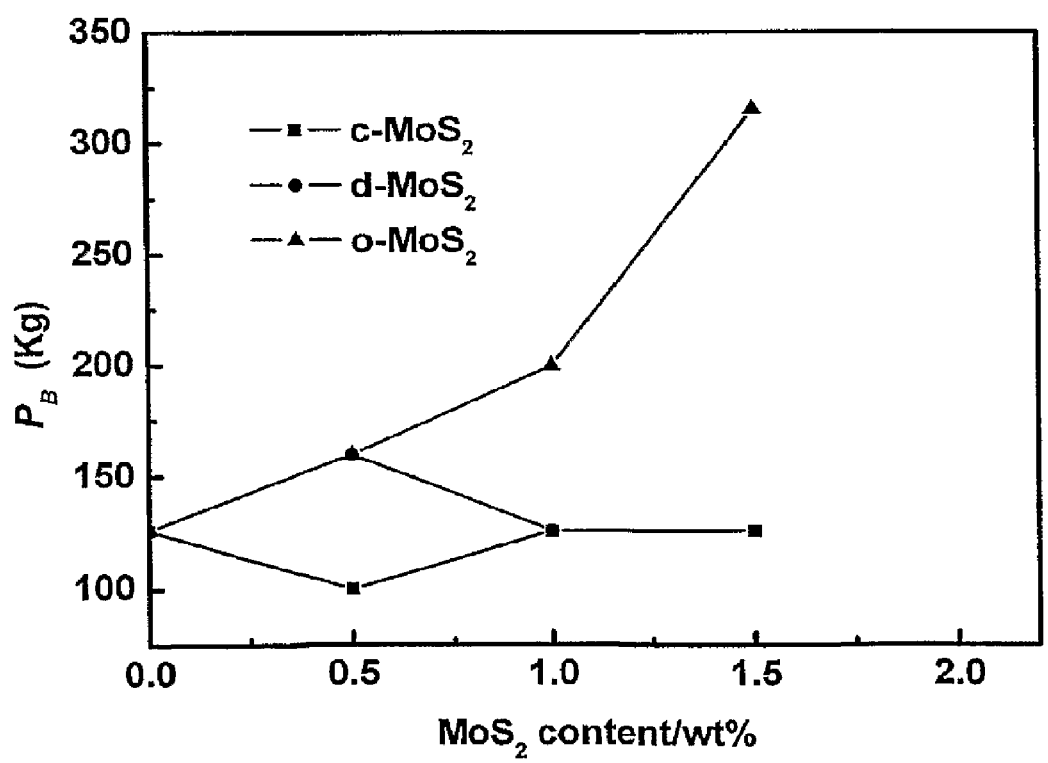
FIG. 6(D) shows the extreme pressure data for paraffin oil with micron sized $MoS_2$ (c-$MoS_2$), paraffin oil with $MoS_2$ that was milled in air for 48 hours (d-$MoS_2$), and paraffin oil with $MoS_2$ that was milled in air for 48 hours followed by milling in canola oil for 48 hours (n-$MoS_2$); in each test the solid lubricant nanoparticle additive was present in the amount of 1% by weight.

Three different particles (in w/w ratio) were evaluated for their anti-wear properties as additives in paraffin oil. FIG. 6(A) shows the average wear scar measurements for paraffin oil without a nanoparticle additive, paraffin oil with micron sized $MoS_2$, paraffin oil with $MoS_2$ that was milled in air for 48 hours, and paraffin oil with $MoS_2$ that was milled in air for 48 hours followed by milling in canola oil for 48 hours. FIG. 6(B) shows the load wear index for paraffin oil without a nanoparticle additive, paraffin oil with micron sized $MoS_2$, paraffin oil with $MoS_2$ that was milled in air for 48 hours, and paraffin oil with $MoS_2$ that was milled in air for 48 hours followed by milling in canola oil for 48 hours. FIG. 6(C) shows the COF for paraffin oil without a nanoparticle additive, paraffin oil with micron sized $MoS_2$, paraffin oil with $MoS_2$ that was milled in air for 48 hours, and paraffin oil with $MoS_2$ that was milled in air for 48 hours followed by milling in canola oil for 48 hours. FIG. 6(D) shows the extreme pressure data for paraffin oil with micron sized $MoS_2$, paraffin oil with $MoS_2$ that was milled in air for 48 hours, and paraffin oil with $MoS_2$ that was milled in air for 48 hours followed by milling in canola oil for 48 hours. In each test the nanoparticle additive was present in the amount of 1% by weight.

Test Data from Nanoparticle Composition Additive in Base Oil

| Solid Lubricant All dispersions diluted to x % by wt. in reference base oil | Four Ball Tests at 40 kg Load (ASTM D4172) | | Four Ball Extreme pressure (ASTM D-2783) | | FIG. 6(A) and 6(b) |
|---|---|---|---|---|---|
| | WSD (mm) | COF | Weld Load (kg) | Load Wear Index | |
| Paraffin oil | 1.033 | 0.155 | 126 | 12.1 | A |
| Nanoparticles of $MoS_2$ without organic medium (0.5%) | 1.012 | 0.102 | 100 | 16.1 | B |
| Nanoparticles of $MoS_2$ without organic medium (1.0%) | 0.960 | 0.114 | 126 | 20.8 | C |
| Nanoparticles of $MoS_2$ without organic medium (1.5%) | 0.915 | 0.098 | 126 | 22.0 | D |
| Conventional available micro particles (0.5%) | 1.009 | 0.126 | 160 | 22.0 | E |
| Conventional available micro particles (1.0%) | 0.948 | 0.091 | 126 | 19.1 | F |
| Conventional available micro particles (1.5%) | 0.922 | 0.106 | 126 | 16.5 | G |
| NanoGlide: Nanoparticles of $MoS_2$ with organic medium (0.5%) | 0.451 | 0.077 | 160 | 24.8 | H |
| NanoGlide: Nanoparticles of $MoS_2$ with organic medium (1.0%) | 0.461 | 0.069 | 200 | 25.9 | I |
| NanoGlide: Nanoparticles of $MoS_2$ with organic medium (1.5%) | 0.466 | 0.075 | 315 | 34.3 | J |

Figure 9:
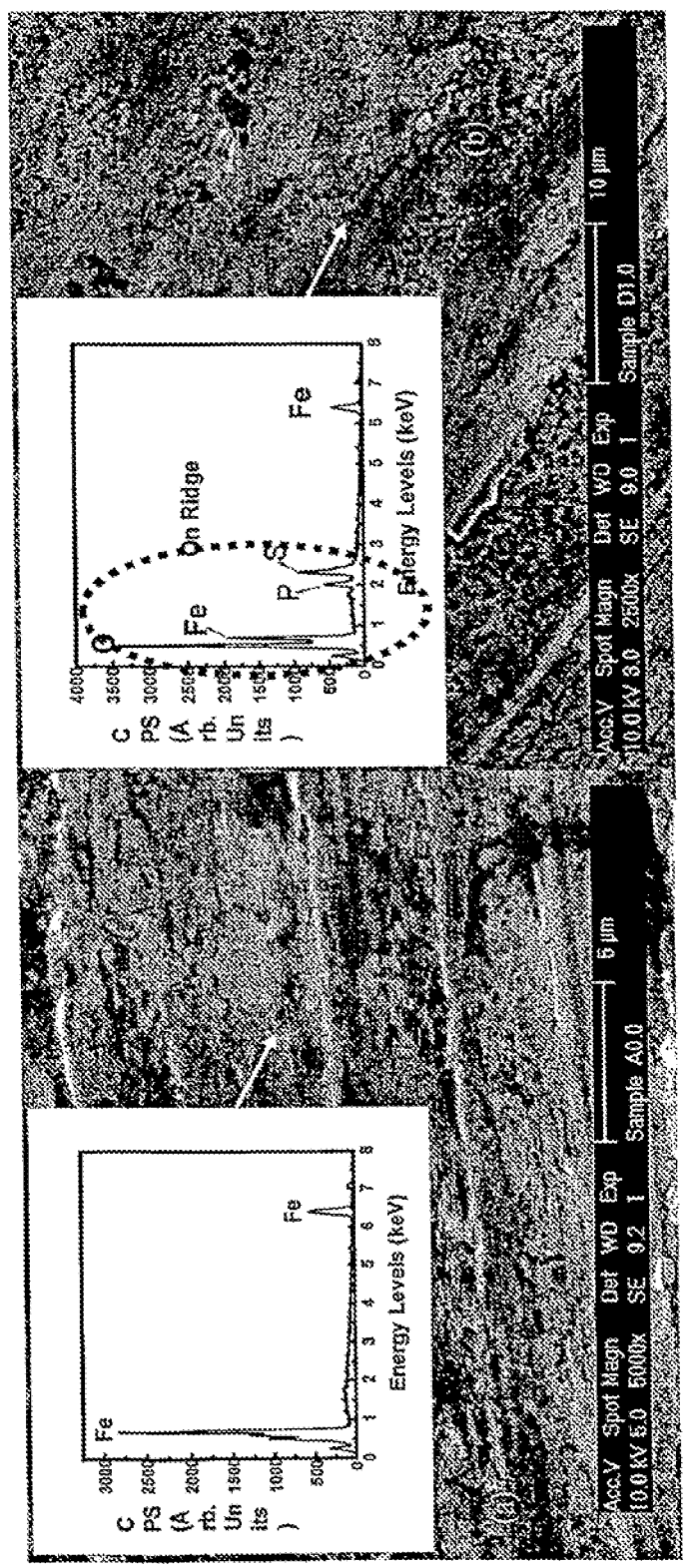
FIG. 9 shows photographs and graphs produced using energy dispersive x-ray analysis (EDS) depicting the chemical analysis of wear scar diameters in four-ball tribological testing for nanoparticle based lubricants.

The transfer film in the wear scar, studied using energy dispersive x-ray analysis (EDS), identified the signatures of phosphates in addition to molybdenum and sulfur. FIG. 9(a) depicts the base case of paraffin oil without a nanoparticle additive. FIG. 9(b) depicts paraffin oil with the molybdenum disulfide nanoparticles and the emulsifier. It shows the early evidences of molybdenum (Mo)-sulfur (S)-phosphorous (P) in the wear track. Iron (Fe) is seen in FIGS. 9(a) and 9(b), as it is the material of the balls (52100 steel) in the four-ball test. The molybdenum and sulfur peaks coincide and are not distinguishable because they have the same binding energy. Elemental mapping also showed similar results.

Prophetic Examples

Examples 2-23 are made using a similar method as Example 1, unless specified otherwise.

Example 2

$MoS_2$ (Alfa Aesar, 98% pure, 700 nm average particle size) and canola oil from ADM are used as the starting materials. The $MoS_2$ powder is ball milled for various time conditions, variable ball/powder ratios, and under various ambient conditions, starting with air, canola oil and the subsequent combination of milling in air followed by milling in canola oil. It is also ball milled in different types of organic media. For example, one organic medium that is used is canola oil methyl ester. The processing of this will be similar to the above mentioned example.

Different types of ball milling processes can be used. For instance, in the first step, cryo ball milling in air followed by high temperature ball milling in an organic medium is used.

After the ball milling, the active EP-EA (extreme pressure—environmentally acceptable) particles are treated with phospholipids that have been mixed with a base oil such as paraffin oil.

Example 3

Molybdenum disulphide is ball milled with boron using a ratio of 1 part molybdenum disulphide to 1 part boron. This mixture is then ball milled with vegetable oil (canola oil) using a ratio of 1 part solid lubricant nanoparticles to 1.5 parts canola oil. An emulsifier is added using a ratio of 1 part solid lubricant nanoparticle composition ($MoS_2$-boron-canola oil) to 2 parts emulsifier. This is added to the base oil (paraffin oil).

Example 4

Molybdenum disulphide is ball milled with copper using a ratio of 1 part molybdenum disulphide to 1 part metal. This mixture is then ball milled with vegetable oil (canola oil) using a ratio of 1 part solid lubricant nanoparticles to 1.5 parts canola oil. An emulsifier is added using a ratio of 1 part solid lubricant nanoparticle composition ($MoS_2$-copper-canola oil) to 2 parts emulsifier. This is added to the base oil (paraffin oil).

Example 5

A molybdenum disulphide/graphite (obtained from Alfa Aesar) mixture in the ratio of 1:1 is ball milled. This mixture is then ball milled with vegetable oil (canola oil) using a ratio of 1 part solid lubricant nanoparticles to 1.5 parts canola oil. An emulsifier is added using a ratio of 1 part solid lubricant nanoparticle composition ($MoS_2$-graphite-canola oil) to 2 parts emulsifier. This is added to the base oil paraffin oil).

Example 6

A molybdenum disulphide/boron nitride (Alfa Aesar) mixture in the ratio of 1:1 mixture is ball milled. This mixture is then ball milled with vegetable oil (canola oil) using a ratio of 1 part solid lubricant nanoparticles to 1.5 parts canola oil. An emulsifier is added using a ratio of 1 part solid lubricant nanoparticle composition ($MoS_2$-boron nitride-canola oil) to 2 parts emulsifier. This is added to the base oil (paraffin oil).

Example 7

A molybdenum disulphide/graphite/boron nitride mixture in the ratio 1:1:1 is ball milled. This mixture is then ball milled with vegetable oil (canola oil) using a ratio of 1 part solid lubricant nanoparticles to 1.5 parts canola oil. An emulsifier is added using a ratio of 1 part solid lubricant nanoparticle composition ($MoS_2$-graphite-boron nitride-canola oil) to 2 parts emulsifier. This is added to the base oil (paraffin oil).

Example 8

A molybdenum disulphide/graphite mixture in the ratio of 1:1:1 is ball milled. This mixture is then ball milled with vegetable oil (canola oil) using a ratio of 1 part solid lubricant nanoparticles to 1.5 parts canola oil. An emulsifier is added using a ratio of 1 part solid lubricant nanoparticle composition ($MoS_2$-graphite-boron-canola oil) to 2 parts emulsifier. This is added to the base oil (paraffin oil).

Example 9

A molybdenum disulphide/graphite mixture in the ratio of 1:1 is ball milled with copper using a ratio of 1 part molybdenum disulphide/graphite to 1 part metal. This mixture is then ball milled with vegetable oil (canola oil) using a ratio of 1 part solid lubricant nanoparticles to 1.5 parts canola oil. An emulsifier is added using a ratio of 1 part solid lubricant nanoparticle composition ($MoS_2$-graphite-copper-canola oil) to 2 parts emulsifier. This is added to the base oil (paraffin oil).

Example 10

A molybdenum disulphide/boron nitride mixture in the ratio of 1:1 is ball milled with boron using a ratio of 1 part molybdenum disulphide/boron nitride to 1 part metal. This mixture is then ball milled with vegetable oil (canola oil) using a ratio of 1 part solid lubricant nanoparticles to 1.5 parts canola oil. An emulsifier is added using a ratio of 1 part solid lubricant nanoparticle composition ($MoS_2$-boron nitride-boron-canola oil) to 2 parts emulsifier. This is added to the base oil (paraffin oil).

Example 11

A molybdenum disulphide/boron nitride mixture in the ratio of 1:1 mixture is ball milled with copper using a ratio of 1 part molybdenum disulphide/boron nitride to 1 part metal. This mixture is then ball milled with vegetable oil (canola oil) using a ratio of 1 part solid lubricant nanoparticles to 1.5 parts canola oil. An emulsifier is added using a ratio of 1 part solid lubricant nanoparticle composition ($MoS_2$-boron nitride-copper-canola oil) to 2 parts emulsifier. This is added to the base oil (paraffin oil).

Example 12

A molybdenum disulphide/boron nitride/graphite mixture in the ratio of 1:1:1 is ball milled with boron using a ratio of 1 part molybdenum disulphide/boron nitride/graphite to 1 part metal. This mixture is then ball milled with vegetable oil (canola oil) using a ratio of 1 part solid lubricant nanoparticles to 1.5 parts canola oil. An emulsifier is added using a ratio of 1 part solid lubricant nanoparticle composition ($MoS_2$-boron nitride-graphite-boron-Canola oil) to 2 parts emulsifier. This is added to the base oil (paraffin oil).

Example 13

A molybdenum disulphide/boron nitride/graphite in the ratio of 1:1:1 is ball milled with copper using a ratio of 1 part molybdenum disulphide/boron nitride/graphite to 1 part metal. This mixture is then ball milled with vegetable oil (canola oil) using a ratio of 1 part solid lubricant nanoparticles to 1.5 parts canola oil. An emulsifier is added using a ratio of 1 part solid lubricant nanoparticle composition ($MoS_2$-boron nitride-graphite-copper-canola oil) to 2 parts emulsifier. This is added to the base oil (paraffin oil).

Example 14

Molybdenum disulphide is ball milled with polytetrafluoroethylene (Teflon®) in a ration of 1 part molybdenum disulphide to 1 part Teflon®. This mixture is then added to the base oil (paraffin oil) with a phospholipid emulsifier (soy lecithin).

Example 15

Molybdenum disulphide is ball milled with polytetrafluoroethylene (Teflon®) in a ration of 1 part molybdenum disulphide to 1 part Teflon®. This mixture is then added to the base oil (paraffin oil) with a phospholipid emulsifier (soy lecithin).

Example 16

Molybdenum disulphide is ball milled with metal additives like copper, silver, lead etc. in a ratio of 1 part molybdenum disulphide to 1 part metal additive. This mixture is further ball milled in vegetable oil based esters (canola oil methyl esters) in a ratio of 1 part solid lubricant nanoparticles to 1.5 parts esters. An emulsifier is added using a ratio of 1 part solid lubricant nanoparticle composition ($MoS_2$-esters) to 2 parts phospholipid emulsifier. This is added to the base oil (paraffin oil).

Example 17

Molybdenum disulphide is ball milled with metal additives like copper, silver, lead etc. in a ratio of 1 part molybdenum disulphide to 1 part metal additive. This mixture is further ball milled in vegetable oil based esters (canola oil methyl esters) in a ratio of 1 part solid lubricant nanoparticles to 1.5 parts esters. This is added to the base oil (paraffin oil).

Example 18

Molybdenum disulphide is ball milled. The solid lubricant nanoparticles are further ball milled in vegetable oil based esters (canola oil methyl esters) in a ratio of 1 part solid lubricant nanoparticles to 1.5 parts esters. An emulsifier is added using a ratio of 1 part solid lubricant nanoparticle composition ($MoS_2$-esters) to 2 parts phospholipid emulsifier. This is added to the base oil (paraffin oil).

Example 19

Molybdenum disulphide is ball milled. The solid lubricant nanoparticles are further ball milled in vegetable oil based esters (canola oil methyl esters) in a ratio of 1 part solid lubricant nanoparticles to 1.5 parts esters. This is added to the base oil (paraffin oil).

Example 20

Molybdenum disulphide is ball milled with metal additives like copper, silver, lead etc. in a ratio of 1 part molybdenum disulphide to 1 part metal additive. This mixture is further ball milled in fatty acids (oleic acid) in a ratio of 1 part solid lubricant nanoparticles to 1.5 parts fatty acids. An emulsifier is added using a ratio of 1 part solid lubricant nanoparticle composition ($MoS_2$-oleic acid) to 2 parts phospholipid emulsifier. This is added to the base oil (paraffin oil).

Example 21

Molybdenum disulphide is ball milled with metal additives like copper, silver, lead etc. in a ratio of 1 part molybdenum disulphide to 1 part metal additive. This mixture is further ball milled in fatty acids (oleic acid) in a ratio of 1 part solid lubricant nanoparticles to 1.5 parts fatty acids. This is added to the base oil (paraffin oil).

Example 22

Molybdenum disulphide is ball milled. The solid lubricant nanoparticles are further ball milled in fatty acids (oleic acid) in a ratio of 1 part solid lubricant nanoparticles to 1.5 parts fatty acids. An emulsifier is added using a ratio of 1 part solid lubricant nanoparticle composition ($MoS_2$-oleic acid) to 2 parts phospholipid emulsifier. This is added to the base oil (paraffin oil).

Example 23

Molybdenum disulphide is ball milled. The solid lubricant nanoparticles are further ball milled in fatty acids (oleic acid) in a ratio of 1 part solid lubricant nanoparticles to 1.5 parts fatty acids. This is added to the base oil (paraffin oil).

What is claimed is:

1. A composition comprising:
   a plurality of nanoparticles having an average particle dimension of less than or equal to about 500 nm and an open architecture; and
   an organic medium bonded to the nanoparticles, wherein the bonds comprise a bond type selected from the group consisting of a complex bond, an alloy bond, and a chemical bond, and wherein the nanoparticles are intercalated with the organic medium.

2. The composition of claim 1, wherein the nanoparticles are intercalated and encapsulated with the organic medium.

3. The composition of claim 1, wherein the nanoparticles are intercalated, encapsulated, and coated with the organic medium.

4. The composition of claim 1, wherein nanoparticles have an average particle dimension of less than or equal to about 100 nm.

5. The composition of claim 1, wherein nanoparticles have an average particle dimension of less than or equal to about 80 nm.

6. The composition of claim 1, wherein nanoparticles have an average particle dimension of less than or equal to about 50 nm.

7. The composition of claim 1, wherein the nanoparticles are selected from the group consisting of molybdenum disulfide nanoparticles, tungsten disulfide nanoparticles, boron nitride nanoparticles, graphite nanoparticles, copper nanoparticles, and combinations of any thereof.

8. The composition of claim 1, wherein the nanoparticles comprise at least one layered material comprising a chalcogenide.

9. The composition of claim 1, wherein the nanoparticles comprise molybdenum disulfide nanoparticles.

10. The composition of claim 1, wherein the organic medium comprises at least one material selected from the group consisting of oil mediums, grease mediums, alcohol mediums, composite oil, canola oil, vegetable oil, soybean oil, corn oil, ethyl and methyl esters of rapeseed oil, distilled monoglycerides, monoglycerides, diglycerides, acetic acid esters of monoglycerides, organic acid esters of monoglycerides, sorbitan, sorbitan esters of fatty acids, propylene glycol esters of fatty acids, polyglycerol esters of fatty acids, hydrocarbon oils, n-hexadecane, phospholipids, dithiophosphates, and combinations of any thereof.

11. The composition of claim 1, wherein the organic medium comprises an oil medium selected from the group consisting of composite oil, canola oil, vegetable oil, soybean oil, corn oil, hydrocarbon oil, and combinations of any thereof.

12. The composition of claim 1, wherein the organic medium comprises a vegetable oil.

13. The composition of claim 1, wherein the organic medium comprises canola oil.

14. The composition of claim 1, wherein the organic material comprises a phospholipid.

15. The composition of claim 1, wherein a weight ratio of nanoparticles to organic medium in the composition ranges from about 1:4 (0.25) to about 1:1.5 (0.67).

16. The composition of claim 1, wherein a weight ratio of nanoparticles to organic medium in the composition ranges from about 1:3 (0.33) to about 1:1.5 (0.67).

17. The composition of claim 1, further comprising a solid lubricant material selected from the group consisting of polytetrafluoroethylene, boron nitride, hexagonal boron nitride, soft metals, silver, lead, nickel, copper, cerium fluoride, zinc oxide, silver sulfate, cadmium iodide, lead iodide, barium fluoride, tin sulfide, zinc phosphate, zinc sulfide, mica, boron nitrate, borax, fluorinated carbon, zinc phosphide, boron, and combinations of any thereof.

18. The composition of claim 17, wherein the solid lubricant material comprises nanoparticles having an average particle dimension of less than or equal to about 500 nm.

19. The composition of claim 17, wherein the solid lubricant material comprises nanoparticles having an average particle dimension of less than or equal to about 100 nm.

20. The composition of claim 1, further comprising a base material, wherein the nanoparticles are dispersed in the base material.

21. The composition of claim 20, wherein the composition comprises from about 0.25% to about 5% nanoparticles by weight of the composition dispersed in the base material.

22. The composition of claim 20, wherein the composition comprises from about 0.5% to about 3% nanoparticles by weight of the composition dispersed in the base material.

23. The composition of claim 20, wherein the composition comprises from about 0.75% to about 2% nanoparticles by weight of the composition dispersed in the base material.

24. The composition of claim 20, wherein the base material comprises at least one material selected from the group consisting of oil, grease, plastic, gel, wax, silicone, hydrocarbon oil, vegetable oil, corn oil, peanut oil, canola oil, soybean oil, mineral oil, paraffin oil, synthetic oil, petroleum gel, petroleum grease, hydrocarbon gel, hydrocarbon grease, lithium based grease, fluoroether based grease, ethylenebistearamide, and combinations of any thereof.

25. The composition of claim 20, wherein the base material comprises at least one material selected from the group consisting of an oil, a grease, a plastic, a gel, a wax, a silicone, and combinations of any thereof.

26. The composition of claim 20, wherein the base material comprises an oil or a grease.

27. The composition of claim 20, wherein the base material comprises at least one material selected from the group consisting of mineral oil, paraffin oil, synthetic oil, petroleum grease, hydrocarbon grease, lithium based grease, and combinations of any thereof.

28. The composition of claim 1, further comprising an emulsifier.

29. The composition of claim 28, wherein the emulsifier comprises at least one material selected from the group consisting of lecithins, phospholipids, soy lecithins, detergents, distilled monoglycerides, monoglycerides, diglycerides, acetic acid esters of monoglycerides, organic acid esters of monoglycerides, sorbitan esters of fatty acids, propylene glycol esters of fatty acids, polyglycerol esters of fatty acids, compounds containing phosphorous, compounds containing sulfur, compounds containing nitrogen, and combinations of any thereof.

30. The composition of claim 28, wherein the emulsifier comprises a compound containing phosphorous.

31. The composition of claim 28, wherein the emulsifier comprises a phospholipid.

32. The composition of claim 28, wherein the emulsifier comprises a lecithin.

33. The composition of claim 28, wherein a weight ratio of organic medium to emulsifier in the composition ranges from about 1:1 (1) to about 1:0.4 (2.5).

34. The composition of claim 28, wherein a weight ratio of organic medium to emulsifier in the composition ranges from about 1:1 (1) to about 1:0.5 (2).

35. The composition of claim 20, further comprising an emulsifier.

36. The composition of claim 35, wherein the composition comprises from about 0.5% to about 10% emulsifier by weight of the composition.

37. The composition of claim 35, wherein the composition comprises from about 4% to about 8% emulsifier by weight of the composition.

38. The composition of claim 35, wherein the composition comprises from about 5% to about 6% emulsifier by weight of the composition.

39. The composition of claim 35, wherein the composition comprises from about 0.75% to about 2.25% emulsifier by weight of the composition.

40. The composition of claim 35, wherein the composition comprises:
    from about 0.5% to about 10% emulsifier by weight of the composition; and
    from about 0.25% to about 5% nanoparticles by weight of the composition dispersed in the base material.

41. The composition of claim 35, wherein the composition comprises:
    from about 5% to about 6% emulsifier by weight of the composition; and
    from about 0.5% to about 3% nanoparticles by weight of the composition dispersed in the base material.

42. The composition of claim 35, wherein the composition comprises:
    from about 0.75% to about 2.25% emulsifier by weight of the composition; and
    from about 0.75% to about 2% nanoparticles by weight of the composition dispersed in the base material.

43. The composition of claim 35, wherein the emulsifier comprises at least one material selected from the group consisting of lecithins, phospholipids, soy lecithins, detergents, distilled monoglycerides, monoglycerides, diglycerides, acetic acid esters of monoglycerides, organic acid esters of monoglycerides, sorbitan esters of fatty acids, propylene glycol esters of fatty acids, polyglycerol esters of fatty acids, compounds containing phosphorous, compounds containing sulfur, compounds containing nitrogen, and combinations of any thereof.

44. The composition of claim 35, wherein the emulsifier comprises a compound containing phosphorous.

45. The composition of claim 35, wherein the emulsifier comprises a phospholipid.

46. The composition of claim 35, wherein the emulsifier comprises a lecithin.

47. The composition of claim 35, wherein the emulsifier has a hydrophilic-lipophillic balance from about 2 to about 7.

48. The composition of claim 35, wherein the emulsifier has a hydrophilic-lipophillic balance from about 3 to about 5.

49. The composition of claim 28, wherein the emulsifier has a hydrophilic-lipophillic balance from about 2 to about 7.

50. The composition of claim 28, wherein the emulsifier has a hydrophilic-lipophillic balance from about 3 to about 5.

51. The composition of claim 1, further comprising an antioxidant.

52. The composition of claim 51, wherein the antioxidant comprises at least one material selected from the group consisting of hindered phenols, alkylated phenols, alkyl amines, aryl amines, 2,6-di-tert-butyl-4-methylphenol, 4,4'-di-tert-octyldiphenylamine, tert-butyl hydroquinone, tris(2,4-di-tert-butylphenyl)phosphate, phosphites, thioesters, and combinations of any thereof.

53. The composition of claim 1, further comprising an anticorrosion agent.

54. The composition of claim 53, wherein the anticorrosion agent comprises at least one material selected from the group consisting of alkaline earth metal bisalkylphenolsulphonates, dithiophosphates, alkenyl succinic acid half-amides, and combinations thereof.

55. The composition of claim 1, further comprising at least one biocidal.

56. The composition of claim 55, wherein the biocidal comprises at least one material selected from the group consisting of alkyl benzothiazole, hydroxylamine benzothiazole, an amine salt of an alkyl succinic acid, an amine salt of an alkenyl succinic acid, a partial alkyl ester of an alkyl succinic acid, a partial alkyl ester of an alkenyl succinic acid, and combinations of any thereof.

57. The composition of claim 1, wherein:
the nanoparticles comprise molybdenum disulfide nanoparticles;
the organic medium comprises a vegetable oil; and
the molybdenum disulfide nanoparticles are intercalated with the vegetable oil.

58. The composition of claim 57, wherein the molybdenum disulfide nanoparticles are intercalated and encapsulated with the vegetable oil.

59. The composition of claim 57, further comprising:
a base comprising an oil or a grease; and
an emulsifier comprising a phospholipid;
wherein the molybdenum disulfide nanoparticles are dispersed in the base.

60. The composition of claim 59, wherein the emulsifier comprises a lecithin.

61. A lubricant comprising the composition of claim 1.

62. The lubricant of claim 61, wherein the lubricant is selected from the group consisting of a machinery lubricant, an aerospace lubricant, an automotive lubricant, a mining lubricant, an engine lubricant, a transmission lubricant, and a pump lubricant.

63. A coating comprising the composition of claim 1.

64. A composite material comprising a polymer and the composition of claim 1.

65. A composite material comprising a plastic and the composition of claim 1.

66. A method comprising adding the composition of claim 1 to a lubricant.

67. A method comprising adding the composition of claim 1 to a coating.

68. A method comprising lubricating an object with a lubricant comprising the composition of claim 1.

69. The method claim 68, wherein the object comprises at least one of machine tools, bearings, gears, camshafts, pumps, transmissions, piston rings, engines, power generators, pin-joints, aerospace systems, mining equipment, manufacturing equipment, inorganic-organic materials, or combinations of any thereof.

70. A method comprising coating an object with a coating comprising the composition of claim 1.

71. The method claim 70, wherein the object comprises at least one of machine tools, bearings, gears, camshafts, pumps, transmissions, piston rings, engines, power generators, pin-joints, aerospace systems, mining equipment, manufacturing equipment, inorganic-organic materials, or combinations of any thereof.

72. A lubricant composition comprising:
a lubricant base material; and
the composition of claim 1;
wherein the nanoparticles are dispersed in the lubricant base material.

73. The lubricant composition of claim 72, wherein the nanoparticles are intercalated and encapsulated with the organic medium.

74. The lubricant composition of claim 72, wherein nanoparticles have an average particle dimension of less than or equal to about 100 nm.

75. The lubricant composition of claim 72, wherein nanoparticles have an average particle dimension of less than or equal to about 80 nm.

76. The lubricant composition of claim 72, wherein nanoparticles have an average particle dimension of less than or equal to about 50 nm.

77. The lubricant composition of claim 72, wherein the lubricant base material comprises at least one material selected from the group consisting of oil, grease, wax, silicone, hydrocarbon oil, vegetable oil, corn oil, peanut oil, canola oil, soybean oil, mineral oil, paraffin oil, synthetic oil, petroleum grease, hydrocarbon gel, hydrocarbon grease, lithium based grease, fluoroether based grease, and combinations of any thereof.

78. The lubricant composition of claim 72, wherein the lubricant base material comprises at least one material selected from the group consisting of an oil, a grease, a wax, a silicone, and combinations of any thereof.

79. The lubricant composition of claim 72, wherein the lubricant base material comprises an oil or a grease.

80. The lubricant composition of claim 72, wherein the lubricant base material comprises at least one material selected from the group consisting of mineral oil, paraffin oil, synthetic oil, petroleum grease, hydrocarbon grease, lithium based grease, and combinations of any thereof.

81. The lubricant composition of claim 72, wherein the nanoparticles are selected from the group consisting of molybdenum disulfide nanoparticles, tungsten disulfide nanoparticles, boron nitride nanoparticles, graphite nanoparticles, copper nanoparticles, and combinations of any thereof.

82. The lubricant composition of claim 72, wherein the nanoparticles comprise at least one layered material comprising a chalcogenide.

83. The lubricant composition of claim 72, wherein the nanoparticles comprise molybdenum disulfide nanoparticles.

84. The lubricant composition of claim 72, wherein the organic medium comprises at least one material selected from the group consisting of oil mediums, grease mediums, alcohol mediums, composite oil, canola oil, vegetable oil, soybean oil, corn oil, ethyl and methyl esters of rapeseed oil, distilled monoglycerides, monoglycerides, diglycerides, acetic acid esters of monoglycerides, organic acid esters of monoglycerides, sorbitan, sorbitan esters of fatty acids, propylene glycol esters of fatty acids, polyglycerol esters of fatty acids, hydrocarbon oils, n-hexadecane, phospholipids, dithiophosphates, and combinations of any thereof.

85. The lubricant composition of claim 72, wherein the organic medium comprises an oil medium selected from the group consisting of composite oil, canola oil, vegetable oil, soybean oil, corn oil, hydrocarbon oil, and combinations of any thereof.

86. The lubricant composition of claim 72, wherein the organic medium comprises a vegetable oil.

87. The lubricant composition of claim 72, wherein the organic medium comprises canola oil.

88. The lubricant composition of claim 72, wherein the organic material comprises a phospholipid.

89. The lubricant composition of claim 72, wherein a weight ratio of nanoparticles to organic medium in the composition ranges from about 1:4 (0.25) to about 1:1.5 (0.67).

90. The lubricant composition of claim 72, wherein a weight ratio of nanoparticles to organic medium in the composition ranges from about 1:3 (0.33) to about 1:1.5 (0.67).

91. The lubricant composition of claim 72, further comprising a solid lubricant material selected from the group consisting of polytetrafluoroethylene, boron nitride, hexagonal boron nitride, soft metals, silver, lead, nickel, copper, cerium fluoride, zinc oxide, silver sulfate, cadmium iodide, lead iodide, barium fluoride, tin sulfide, zinc phosphate, zinc sulfide, mica, boron nitrate, borax, fluorinated carbon, zinc phosphide, boron, and combinations of any thereof.

92. The lubricant composition of claim 91, wherein the solid lubricant material comprises nanoparticles having an average particle dimension of less than or equal to about 500 nm.

93. The lubricant composition of claim 91, wherein the solid lubricant material comprises nanoparticles having an average particle dimension of less than or equal to about 100 nm.

94. The lubricant composition of claim 72, wherein the composition comprises from about 0.25% to about 5% nanoparticles by weight of the composition dispersed in the lubricant base material.

95. The lubricant composition of claim 72, wherein the composition comprises from about 0.5% to about 3% nanoparticles by weight of the composition dispersed in the lubricant base material.

96. The lubricant composition of claim 72, wherein the composition comprises from about 0.5% to about 2% nanoparticles by weight of the composition dispersed in the lubricant base material.

97. The lubricant composition of claim 72, wherein the composition comprises from about 0.75% to about 2% nanoparticles by weight of the composition dispersed in the lubricant base material.

98. The lubricant composition of claim 72, further comprising an emulsifier.

99. The lubricant composition of claim 98, wherein the emulsifier comprises at least one material selected from the group consisting of lecithins, phospholipids, soy lecithins, detergents, distilled monoglycerides, monoglycerides, diglycerides, acetic acid esters of monoglycerides, organic acid esters of monoglycerides, sorbitan esters of fatty acids, propylene glycol esters of fatty acids, polyglycerol esters of fatty acids, compounds containing phosphorous, compounds containing sulfur, compounds containing nitrogen, and combinations of any thereof.

100. The lubricant composition of claim 98, wherein the emulsifier comprises a compound containing phosphorous.

101. The lubricant composition of claim 98, wherein the emulsifier comprises a phospholipid.

102. The lubricant composition of claim 98, wherein the emulsifier comprises a lecithin.

103. The lubricant composition of claim 98, wherein a weight ratio of organic medium to emulsifier in the composition ranges from about 1:1 (1) to about 1:0.4 (2.5).

104. The lubricant composition of claim 98, wherein a weight ratio of organic medium to emulsifier in the composition ranges from about 1:1 (1) to about 1:0.5 (2).

105. The lubricant composition of claim 98, wherein the composition comprises from about 0.5% to about 10% emulsifier by weight of the composition.

106. The lubricant composition of claim 98, wherein the composition comprises from about 4% to about 8% emulsifier by weight of the composition.

107. The lubricant composition of claim 98, wherein the composition comprises from about 5% to about 6% emulsifier by weight of the composition.

108. The lubricant composition of claim 98, wherein the composition comprises from about 0.75% to about 2.25% emulsifier by weight of the composition.

109. The lubricant composition of claim 98, wherein the composition comprises:
from about 0.5% to about 10% emulsifier by weight of the composition; and
from about 0.25% to about 5% nanoparticles by weight of the composition dispersed in the base material.

110. The lubricant composition of claim 98, wherein the composition comprises:
from about 5% to about 6% emulsifier by weight of the composition; and
from about 0.5% to about 3% nanoparticles by weight of the composition dispersed in the base material.

111. The lubricant composition of claim 98, wherein the composition comprises:
from about 0.75% to about 2.25% emulsifier by weight of the composition; and
from about 0.75% to about 2% nanoparticles by weight of the composition dispersed in the base material.

112. The lubricant composition of claim 98, wherein the emulsifier has a hydrophilic-lipophillic balance from about 2 to about 7.

113. The lubricant composition of claim 98, wherein the emulsifier has a hydrophilic-lipophillic balance from about 3 to about 5.

114. The lubricant composition of claim 72, further comprising an antioxidant.

115. The lubricant composition of claim 114, wherein the antioxidant comprises at least one material selected from the group consisting of hindered phenols, alkylated phenols, alkyl amines, aryl amines, 2,6-di-tert-butyl-4-methylphenol, 4,4'-di-tert-octyldiphenylamine, tert-butyl hydroquinone, tris(2,4-di-tert-butylphenyl)phosphate, phosphites, thioesters, and combinations of any thereof.

116. The lubricant composition of claim 72, further comprising an anticorrosion agent.

117. The lubricant composition of claim 116, wherein the anticorrosion agent comprises at least one material selected from the group consisting of alkaline earth metal bisalkylphenolsulphonates, dithiophosphates, alkenyl succinic acid half-amides, and combinations thereof.

118. The lubricant composition of claim 72, further comprising at least one biocidal.

119. The lubricant composition of claim 118, wherein the biocidal comprises at least one material selected from the group consisting of alkyl benzothiazole, hydroxylamine benzothiazole, an amine salt of an alkyl succinic acid, an amine salt of an alkenyl succinic acid, a partial alkyl ester of an alkyl succinic acid, a partial alkyl ester of an alkenyl succinic acid, and combinations of any thereof.

120. The lubricant composition of claim 72, wherein:
lubricant base material comprises an oil or a grease;
the nanoparticles comprise molybdenum disulfide nanoparticles; and
the organic medium comprises a vegetable oil.

121. The lubricant composition of claim 120, wherein the molybdenum disulfide nanoparticles are intercalated and encapsulated with the vegetable oil.

122. The lubricant composition of claim 120, further comprising an emulsifier comprising a phospholipid.

123. The lubricant composition of claim 122, wherein the emulsifier comprises a lecithin.

124. The composition of claim 1, wherein:
the nanoparticles comprise molybdenum disulfide nanoparticles; and
the organic medium comprises an oil medium intercalated in the nanoparticles.

125. The composition of claim 124, wherein the molybdenum disulfide nanoparticles have an open architecture.

126. The composition of claim 124, wherein the oil medium is bonded to the molybdenum disulfide nanoparticles, and wherein the bonds comprise a bond type selected from the group consisting of a complex bond, an alloy bond, and a chemical bond.

127. The composition of claim 124, wherein the molybdenum disulfide nanoparticles are intercalated and encapsulated with the oil medium.

128. The composition of claim 124, wherein the molybdenum disulfide nanoparticles are intercalated, encapsulated, and coated with the organic medium.

129. The composition of claim 124, wherein molybdenum disulfide nanoparticles have an average particle dimension of less than or equal to about 100 nm.

130. The composition of claim 124, wherein molybdenum disulfide nanoparticles have an average particle dimension of less than or equal to about 80 nm.

131. The composition of claim 124, wherein molybdenum disulfide nanoparticles have an average particle dimension of less than or equal to about 50 nm.

132. The composition of claim 124, further comprising additional nanoparticles selected from the group consisting of tungsten disulfide nanoparticles, boron nitride nanoparticles, graphite nanoparticles, copper nanoparticles, and combinations of any thereof.

133. The composition of claim 124, wherein the oil medium comprises at least one oil medium selected from the group consisting of composite oil, canola oil, vegetable oil, soybean oil, corn oil, hydrocarbon oil, and combinations of any thereof.

134. The composition of claim 124, wherein the oil medium comprises a vegetable oil.

135. The composition of claim 124, wherein the oil medium comprises canola oil.

136. The composition of claim 124, wherein a weight ratio of molybdenum disulfide nanoparticles to oil medium in the composition ranges from about 1:4 (0.25) to about 1:1.5 (0.67).

137. The composition of claim 124, wherein a weight ratio of molybdenum disulfide nanoparticles to oil medium in the composition ranges from about 1:3 (0.33) to about 1:1.5 (0.67).

138. The composition of claim 124, further comprising a solid lubricant material selected from the group consisting of polytetrafluoroethylene, boron nitride, hexagonal boron nitride, soft metals, silver, lead, nickel, copper, cerium fluoride, zinc oxide, silver sulfate, cadmium iodide, lead iodide, barium fluoride, tin sulfide, zinc phosphate, zinc sulfide, mica, boron nitrate, borax, fluorinated carbon, zinc phosphide, boron, and combinations of any thereof.

139. The composition of claim 138, wherein the solid lubricant material comprises nanoparticles having an average particle dimension of less than or equal to about 500 nm.

140. The composition of claim 138, wherein the solid lubricant material comprises nanoparticles having an average particle dimension of less than or equal to about 100 nm.

141. The composition of claim 124, further comprising a base material, wherein the molybdenum disulfide nanoparticles are dispersed in the base material.

142. The composition of claim 141, wherein the composition comprises from about 0.25% to about 5% nanoparticles by weight of the composition dispersed in the base material.

143. The composition of claim 141, wherein the composition comprises from about 0.5% to about 3% nanoparticles by weight of the composition dispersed in the base material.

144. The composition of claim 141, wherein the composition comprises from about 0.75% to about 2% nanoparticles by weight of the composition dispersed in the base material.

145. The composition of claim 141, wherein the base material comprises at least one material selected from the group consisting of oil, grease, plastic, gel, wax, silicone, hydrocarbon oil, vegetable oil, corn oil, peanut oil, canola oil, soybean oil, mineral oil, paraffin oil, synthetic oil, petroleum gel, petroleum grease, hydrocarbon gel, hydrocarbon grease, lithium based grease, fluoroether based grease, ethylenebistearamide, and combinations of any thereof.

146. The composition of claim 141, wherein the base material comprises at least one material selected from the group consisting of an oil, a grease, a plastic, a gel, a wax, a silicone, and combinations of any thereof.

147. The composition of claim 141, wherein the base material comprises an oil or a grease.

148. The composition of claim 141, wherein the base material comprises at least one material selected from the group consisting of mineral oil, paraffin oil, synthetic oil, petroleum grease, hydrocarbon grease, lithium based grease, and combinations of any thereof.

149. The composition of claim 124, further comprising an emulsifier.

150. The composition of claim 149, wherein the emulsifier comprises at least one material selected from the group consisting of lecithins, phospholipids, soy lecithins, detergents, distilled monoglycerides, monoglycerides, diglycerides, acetic acid esters of monoglycerides, organic acid esters of monoglycerides, sorbitan esters of fatty acids, propylene glycol esters of fatty acids, polyglycerol esters of fatty acids, compounds containing phosphorous, compounds containing sulfur, compounds containing nitrogen, and combinations of any thereof.

151. The composition of claim 149, wherein the emulsifier comprises a compound containing phosphorous.

152. The composition of claim 149, wherein the emulsifier comprises a phospholipid.

153. The composition of claim 149, wherein the emulsifier comprises a lecithin.

154. The composition of claim 149, wherein a weight ratio of organic medium to emulsifier in the composition ranges from about 1:1 (1) to about 1:0.4 (2.5).

155. The composition of claim 149, wherein a weight ratio of organic medium to emulsifier in the composition ranges from about 1:1 (1) to about 1:0.5 (2).

156. The composition of claim 149, wherein the emulsifier has a hydrophilic-lipophillic balance from about 2 to about 7.

157. The composition of claim 149, wherein the emulsifier has a hydrophilic-lipophillic balance from about 3 to about 5.

158. The composition of claim 141, further comprising an emulsifier.

159. The composition of claim 158, wherein the composition comprises from about 0.5% to about 10% emulsifier by weight of the composition.

160. The composition of claim 158, wherein the composition comprises from about 4% to about 8% emulsifier by weight of the composition.

161. The composition of claim 158, wherein the composition comprises from about 5% to about 6% emulsifier by weight of the composition.

162. The composition of claim 158, wherein the composition comprises from about 0.75% to about 2.25% emulsifier by weight of the composition.

163. The composition of claim 158, wherein the composition comprises:
from about 0.5% to about 10% emulsifier by weight of the composition; and
from about 0.25% to about 5% nanoparticles by weight of the composition dispersed in the base material.

164. The composition of claim 158, wherein the composition comprises:
from about 5% to about 6% emulsifier by weight of the composition; and
from about 0.5% to about 3% nanoparticles by weight of the composition dispersed in the base material.

165. The composition of claim 158, wherein the composition comprises:
from about 0.75% to about 2.25% emulsifier by weight of the composition; and
from about 0.75% to about 2% nanoparticles by weight of the composition dispersed in the base material.

166. The composition of claim 124, further comprising an antioxidant.

167. The composition of claim 166, wherein the antioxidant comprises at least one material selected from the group consisting of hindered phenols, alkylated phenols, alkyl amines, aryl amines, 2,6-di-tert-butyl-4-methylphenol, 4,4'-di-tert-octyldiphenylamine, tert-butyl hydroquinone, tris(2,4-di-tert-butylphenyl)phosphate, phosphites, thioesters, and combinations of any thereof.

168. The composition of claim 124, further comprising an anticorrosion agent.

169. The composition of claim 168, wherein the anticorrosion agent comprises at least one material selected from the group consisting of alkaline earth metal bisalkylphenol-sulphonates, dithiophosphates, alkenyl succinic acid half-amides, and combinations thereof.

170. The composition of claim 124, further comprising at least one biocidal.

171. The composition of claim 170, wherein the biocidal comprises at least one material selected from the group consisting of alkyl benzothiazole, hydroxylamine benzothiazole, an amine salt of an alkyl succinic acid, an amine salt of an alkenyl succinic acid, a partial alkyl ester of an alkyl succinic acid, a partial alkyl ester of an alkenyl succinic acid, and combinations of any thereof.

172. A lubricant comprising the composition of claim 124.

173. The lubricant of claim 169, wherein the lubricant is selected from the group consisting of a machinery lubricant, an aerospace lubricant, an automotive lubricant, a mining lubricant, an engine lubricant, a transmission lubricant, and a pump lubricant.

174. A coating comprising the composition of claim 124.

175. A method of making a nanoparticle composition comprising:
(a) dry milling a solid lubricant until the dry milled solid lubricant comprises nanoparticles having an average particle dimension less than or equal to about 500 nm; and
(b) then wet milling the nanoparticles in an organic medium until at least a portion of the nanoparticles have an open architecture and comprise the organic medium bonded to the nanoparticles, wherein the bonds comprise a bond type selected from the group consisting of a complex bond, an alloy bond, and a chemical bond, and wherein the nanoparticles are wet milled until at least a portion of the nanoparticles are intercalated with the organic medium.

176. The method of claim 175, wherein the solid lubricant is dry milled until the nanoparticles have an average particle dimension less than or equal to about 100 nm.

177. The method of claim 175, wherein the solid lubricant is selected from the group consisting of molybdenum disulfide, tungsten disulfide, boron nitride, graphite, copper, and combinations of any thereof.

178. The method of claim 175, wherein the solid lubricant comprises at least one layered material comprising a chalcogenide.

179. The method of claim 175, wherein the solid lubricant comprises molybdenum disulfide.

180. The method of claim 175, wherein the organic medium comprises at least one material selected from the group consisting of oil mediums, grease mediums, alcohol mediums, composite oil, canola oil, vegetable oil, soybean oil, corn oil, ethyl and methyl esters of rapeseed oil, distilled monoglycerides, monoglycerides, diglycerides, acetic acid esters of monoglycerides, organic acid esters of monoglycerides, sorbitan, sorbitan esters of fatty acids, propylene glycol esters of fatty acids, polyglycerol esters of fatty acids, hydrocarbon oils, n-hexadecane, phospholipids, dithiophosphates, and combinations of any thereof.

181. The method of claim 175, wherein the organic medium comprises an oil medium selected from the group consisting of composite oil, canola oil, vegetable oil, soybean oil, corn oil, hydrocarbon oil, and combinations of any thereof.

182. The method of claim 175, wherein the organic medium comprises a vegetable oil.

183. The method of claim 175, wherein the organic medium comprises canola oil.

184. The method of claim 175, wherein the organic material comprises a phospholipid.

185. The method of claim 175, wherein a weight ratio of nanoparticles to organic medium in the wet milling step ranges from about 1:4 (0.25) to about 1:1.5 (0.67).

186. The method of claim 175, wherein a weight ratio of nanoparticles to organic medium in the wet milling step ranges from about 1:3 (0.33) to about 1:1.5 (0.67).

187. The method of claim 175, further comprising adding at least one additional solid lubricant at step (a), step (b), or steps (a) and (b), the additional solid lubricant comprising at least one material selected from the group consisting of polytetrafluoroethylene, boron nitride, hexagonal boron nitride, soft metals, silver, lead, nickel, copper, cerium fluoride, zinc oxide, silver sulfate, cadmium iodide, lead iodide, barium fluoride, tin sulfide, zinc phosphate, zinc sulfide, mica, boron nitrate, borax, fluorinated carbon, zinc phosphide, boron, and combinations of any thereof.

188. The method of claim 175, further comprising adding the wet milled nanoparticles into a base material.

189. The method of claim 188, wherein the nanoparticles are added to the base material to form a composition comprising from about 0.25% to about 5% nanoparticles by weight of the composition dispersed in the base material.

190. The method of claim 188, wherein the nanoparticles are added to the base material to form a composition comprising from about 0.5% to about 3% nanoparticles by weight of the composition dispersed in the base material.

191. The method of claim 188, wherein the nanoparticles are added to the base material to form a composition comprising from about 0.27% to about 2% nanoparticles by weight of the composition dispersed in the base material.

192. The method of claim 188, wherein the base material comprises at least one material selected from the group consisting of oil, grease, plastic, gel, wax, silicone, hydrocarbon oil, vegetable oil, corn oil, peanut oil, canola oil, soybean oil, mineral oil, paraffin oil, synthetic oil, petroleum gel, petroleum grease, hydrocarbon gel, hydrocarbon grease, lithium based grease, fluoroether based grease, ethylenebistearamide, and combinations of any thereof.

193. The method of claim 188, wherein the base material comprises at least one material selected from the group consisting of an oil, a grease, a plastic, a gel, a wax, a silicone, and combinations of any thereof.

194. The method of claim 188, wherein the base material comprises an oil or a grease.

195. The method of claim 188, wherein the base comprises at least one material selected from the group consisting of mineral oil, paraffin oil, synthetic oil, petroleum grease, hydrocarbon grease, lithium based grease, and combinations of any thereof.

196. The method of claim 188, further comprising adding an emulsifier to the base material.

197. The method of claim 196, wherein the emulsifier is added to the base material before the wet milled nanoparticles are added to the base material.

198. The method of claim 196, wherein the emulsifier is added to the base material after the wet milled nanoparticles are added to the base material.

199. The method of claim 196, wherein the emulsifier and the wet milled nanoparticles are added to the base material simultaneously.

200. The method of claim 196, wherein the emulsifier comprises at least one material selected from the group consisting of lecithins, phospholipids, soy lecithins, detergents, distilled monoglycerides, monoglycerides, diglycerides, acetic acid esters of monoglycerides, organic acid esters of monoglycerides, sorbitan esters of fatty acids, propylene glycol esters of fatty acids, polyglycerol esters of fatty acids, compounds containing phosphorous, compounds containing sulfur, compounds containing nitrogen, and combinations of any thereof.

201. The method of claim 196, wherein the emulsifier comprises a compound containing phosphorous.

202. The method of claim 196, wherein the emulsifier comprises a phospholipid.

203. The method of claim 196, wherein the emulsifier comprises a lecithin.

204. The method of claim 196, wherein the emulsifier is added to the base material to form a composition comprising from about 0.5% to about 10% emulsifier by weight of the composition.

205. The method of claim 196, wherein the emulsifier is added to the base material to form a composition comprising from about 4% to about 8% emulsifier by weight of the composition.

206. The method of claim 196, wherein the emulsifier is added to the base material to form a composition comprising from about 5% to about 6% emulsifier by weight of the composition.

207. The method of claim 196, wherein the emulsifier is added to the base material to form a composition comprising from about 0.75% to about 2.25% emulsifier by weight of the composition.

208. The method of claim 196, wherein the emulsifier has a hydrophilic-lipophillic balance from about 2 to about 7.

209. The method of claim 196, wherein the emulsifier has a hydrophilic-lipophillic balance from about 3 to about 5.

210. The method of claim 175, further comprising adding at least one additive at step (a), step (b), or steps (a) and (b), the additive comprising at least one material selected from the group consisting of antioxidant, anticorrosion agents, and biocidals.

211. The method of claim 210, wherein the additive comprises an antioxidant selected from the group consisting of hindered phenols, alkylated phenols, alkyl amines, aryl amines, 2,6-di-tert-butyl-4-methylphenol, 4,4'-di-tert-octyldiphenylamine, tert-butyl hydroquinone, tris(2,4-di-tert-butylphenyl)phosphate, phosphites, thioesters, and combinations of any thereof.

212. The method of claim 210, wherein the additive comprises an anticorrosion agent selected from the group consisting of alkaline earth metal bisalkylphenolsulphonates, dithiophosphates, alkenyl succinic acid half-amides, and combinations thereof.

213. The method of claim 210, wherein the additive comprises a biocidal selected from the group consisting of alkyl benzothiazole, hydroxylamine benzothiazole, an amine salt of an alkyl succinic acid, an amine salt of an alkenyl succinic acid, a partial alkyl ester of an alkyl succinic acid, a partial alkyl ester of an alkenyl succinic acid, and combinations of any thereof.

214. A method comprising:
lubricating an object with a nanoparticle composition, the nanoparticle composition comprising:
a plurality of nanoparticles having an average particle dimension of less than or equal to about 500 nm and an open architecture; and
an organic medium bonded to the nanoparticles, wherein the bonds comprise a bond type selected from the group consisting of a complex bond, an alloy bond, and a chemical bond, and wherein the nanoparticles are intercalated with the organic medium.

215. A method comprising:
coating an object with a nanoparticle composition, the nanoparticle composition comprising:
- a plurality of nanoparticles having an average particle dimension of less than or equal to about 500 nm and an open architecture; and
- an organic medium bonded to the nanoparticles, wherein the bonds comprise a bond type selected from the group consisting of a complex bond, an alloy bond, and a chemical bond, and wherein the nanoparticles are intercalated with the organic medium.

216. A method comprising:
delivering an agent to an object with a nanoparticle composition, the nanoparticle composition comprising:
- the agent;
- a plurality of nanoparticles having an average particle dimension of less than or equal to about 500 nm and an open architecture; and
- an organic medium bonded to the nanoparticles, wherein the bonds comprise a bond type selected from the group consisting of a complex bond, an alloy bond, and a chemical bond, and wherein the nanoparticles are intercalated with the organic medium.

217. The composition of claim 1, wherein the organic medium is bonded to the nanoparticles to form an additive package.

* * * * *